United States Patent
Tomizawa et al.

(10) Patent No.: US 8,026,934 B2
(45) Date of Patent: Sep. 27, 2011

(54) DRIVING CONTROL APPARATUS OF DISPLAY APPARATUS, DISPLAY METHOD, DISPLAY APPARATUS, DISPLAY MONITOR, AND TELEVISION RECEIVER

(75) Inventors: Kazunari Tomizawa, Kizugawa (JP); Makoto Shiomi, Tenri (JP); Shinji Horino, Kishiwada (JP)

(73) Assignee: Sharp Kabushiki Kaisha, Osaka (JP)

( * ) Notice: Subject to any disclaimer, the term of this patent is extended or adjusted under 35 U.S.C. 154(b) by 893 days.

(21) Appl. No.: 11/990,018

(22) PCT Filed: Aug. 8, 2006

(86) PCT No.: PCT/JP2006/315683
§ 371 (c)(1),
(2), (4) Date: Feb. 5, 2008

(87) PCT Pub. No.: WO2007/018219
PCT Pub. Date: Feb. 15, 2007

(65) Prior Publication Data
US 2010/0164996 A1 Jul. 1, 2010

(30) Foreign Application Priority Data
Aug. 9, 2005 (JP) .................................. 2005-231088

(51) Int. Cl.
*G09G 5/10* (2006.01)
(52) U.S. Cl. ........................... 345/690; 345/89; 345/204
(58) Field of Classification Search .................... 345/84, 345/87, 89, 204, 213, 690
See application file for complete search history.

(56) References Cited

U.S. PATENT DOCUMENTS

| | | | |
|---|---|---|---|
| 2001/0038369 A1 | 11/2001 | Adachi et al. | |
| 2003/0006952 A1* | 1/2003 | Hong | 345/89 |
| 2003/0048247 A1 | 3/2003 | Ham | |
| 2003/0156092 A1 | 8/2003 | Suzuki et al. | |
| 2004/0017343 A1 | 1/2004 | Adachi et al. | |
| 2004/0155847 A1 | 8/2004 | Taoka et al. | |
| 2004/0196229 A1 | 10/2004 | Ham | |
| 2004/0196274 A1* | 10/2004 | Song et al. | 345/204 |
| 2005/0162360 A1 | 7/2005 | Ishihara et al. | |
| 2005/0253785 A1 | 11/2005 | Miyasaka et al. | |

FOREIGN PATENT DOCUMENTS

| | | |
|---|---|---|
| JP | 2001-343956 | 12/2001 |
| JP | 2003-84742 | 3/2003 |
| JP | 2003-241721 | 8/2003 |
| JP | 2004-240317 | 8/2004 |
| JP | 2005-173387 | 6/2005 |
| JP | 2005-173573 | 6/2005 |

* cited by examiner

*Primary Examiner* — Amare Mengistu
*Assistant Examiner* — Premal Patel
(74) *Attorney, Agent, or Firm* — Harness, Dickey & Pierce, P.L.C.

(57) ABSTRACT

In one embodiment of the present invention, to time-divide one frame of an input image signal into a first-half sub frame and a second-half sub frame, the grayscale of the signal in the second-half sub frame is set at a grayscale for dark display and the grayscale of the display signal of the first-half sub frame is adjusted, when the input image signal indicates low brightness. When an image with high brightness is displayed, the grayscale of the display signal of the first-half sub frame is set at a second predetermined value smaller than the maximum value and the grayscale of the display signal of the second-half sub frame is adjusted. Thereafter, in accordance with a combination of the input image signals of the (N-1)-th frame and the N-th frame, overshoot is performed with respect to the display signal of the first-half sub frame.

22 Claims, 18 Drawing Sheets

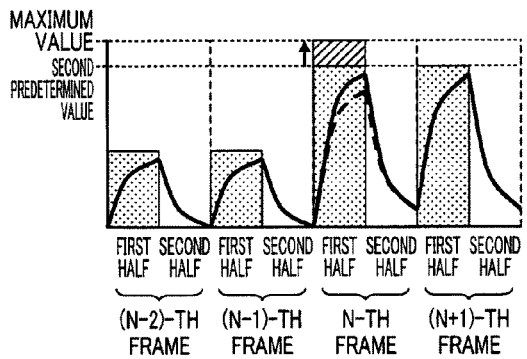
FIG. 1(a) FROM LOW GRAYSCALE TO HIGH GRAYSCALE (RISE)
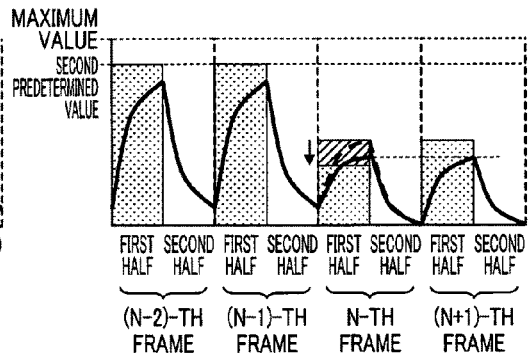
FIG. 1(b) FROM LOW GRAYSCALE TO LOW GRAYSCALE (DECAY)
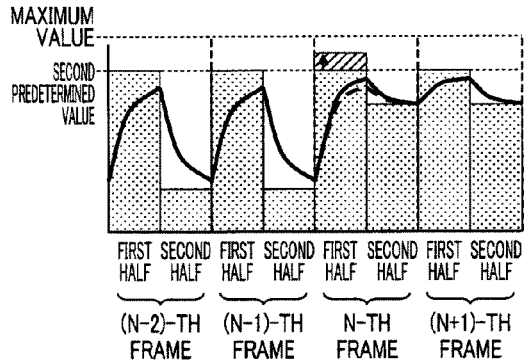
FIG. 1(c) FROM HIGH GRAYSCALE TO HIGH GRAYSCALE (RISE)
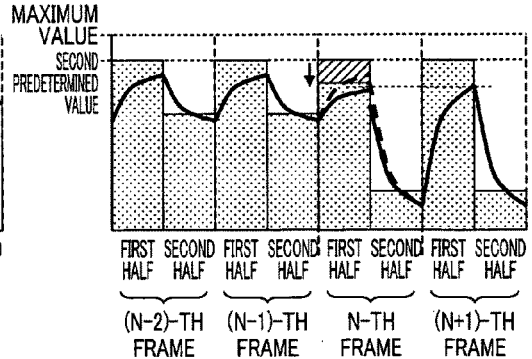
FIG. 1(d) FROM HIGH GRAYSCALE TO HIGH GRAYSCALE (DECAY)
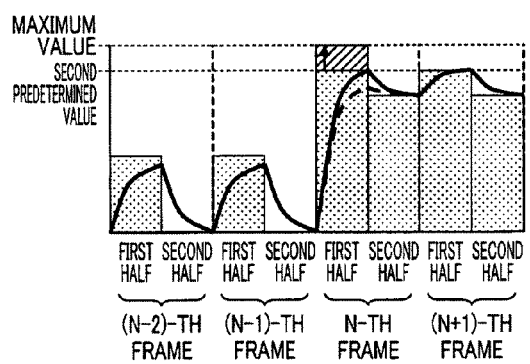
FIG. 1(e) FROM LOW GRAYSCALE TO HIGH GRAYSCALE (RISE)
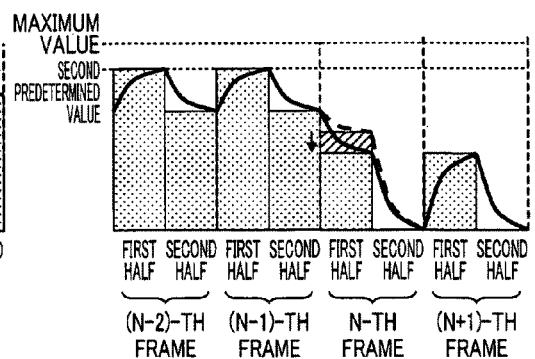
FIG. 1(f) FROM HIGH GRAYSCALE TO LOW GRAYSCALE (DECAY)

PRIOR ART
FIG. 18(a) FROM LOW GRAYSCALE TO HIGH GRAYSCALE (RISE)
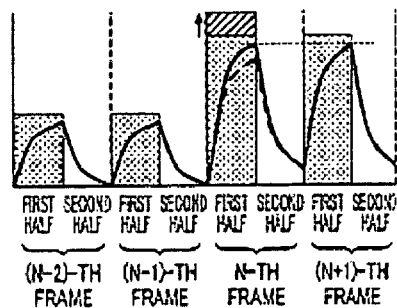
FIG. 18(b) FROM LOW GRAYSCALE TO LOW GRAYSCALE (DECAY)
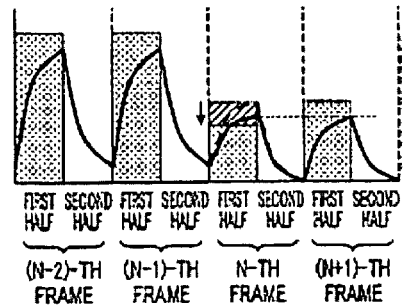
FIG. 18(c) FROM HIGH GRAYSCALE TO HIGH GRAYSCALE (RISE)
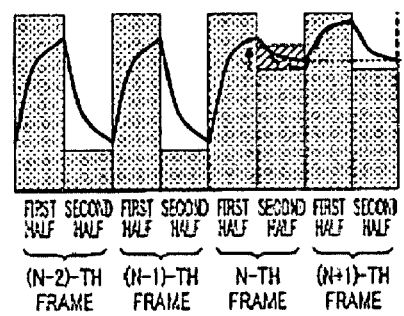
FIG. 18(d) FROM HIGH GRAYSCALE TO HIGH GRAYSCALE (DECAY)
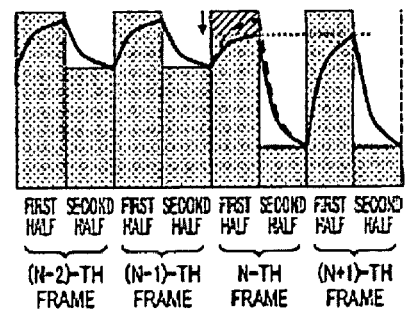
FIG. 18(e) FROM LOW GRAYSCALE TO HIGH GRAYSCALE (RISE)
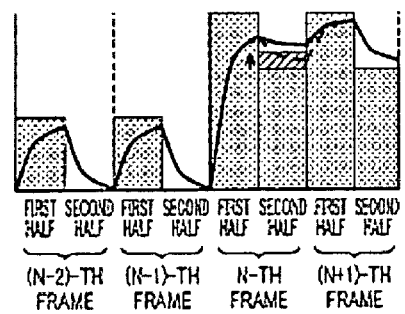
FIG. 18(f) FROM HIGH GRAYSCALE TO LOW GRAYSCALE (DECAY)
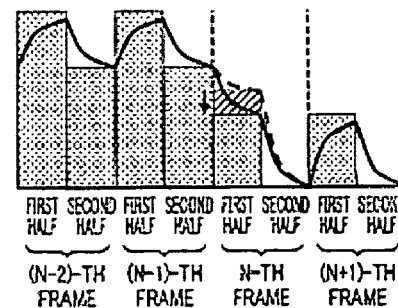

DRIVING CONTROL APPARATUS OF DISPLAY APPARATUS, DISPLAY METHOD, DISPLAY APPARATUS, DISPLAY MONITOR, AND TELEVISION RECEIVER

TECHNICAL FIELD

The present invention relates to a display apparatus which displays an image corresponding to one frame by time-dividing a frame for one image into plural sub frames and displaying the image corresponding to the sub frames in one frame period.

BACKGROUND ART

In various technical fields, CRTs (Cathode Ray Tubes) have gradually been replaced by hold-type display apparatuses including a liquid crystal display module or an EL display module.

It is considered, however, that hold-type display apparatuses are inferior in moving image qualities to impulse-type display apparatuses such as CRTs (Cathode Ray Tubes) in which a turn-on time during which an image is displayed and a turn-off time during which an image is not displayed are alternated.

That is to say, in a typical hold-type display apparatus, a whole one frame period is an image turn-on time. On this account, once a frame image is updated, an object is being displayed until the image is updated in the next frame, and the image displayed in this way appears as motion blur for the viewer.

To achieve improvement in the moving image quality as one of the objectives, various methods have been proposed to perform the driving in such a way as to time-divide a single frame for displaying one image into plural sub frames. An example of such methods is disclosed by Patent Document 1. It is noted that image display apparatuses adopting organic LED panels have been arranged so that vertical scanning is multiplexed.

In addition to the motion blur, liquid crystal display apparatuses have a typical problem of low response speed of liquid crystal elements. Because of this problem of response speed, liquid crystal display apparatuses have the following disadvantage: when input grayscales greatly change between successive frames, the brightness response level in the later frame may not reach a desired brightness level, i.e. may not reach the brightness level when input grayscales do not change between successive frames.

To compensate the low response speed, there is a known technology termed overshoot driving. Overshoot driving is arranged such that, in accordance with a change (increase or decrease) in input grayscales between successive frames, a voltage which is higher or lower than a voltage by which a desired grayscale level is achieved when input grayscales do not change between successive frames is supplied to liquid crystal elements, so that the liquid crystal elements are forcibly driven at a high speed. For example, Patent Document 2 discloses a technology to perform overshoot driving in a liquid crystal display apparatus in which a single frame is divided into plural sub frames (fields) for image display.

[Patent Document 1]
Japanese Laid-Open Patent Application No. 2005-173573 (published on Jun. 30, 2005)

[Patent Document 2]
Japanese Laid-Open Patent Application No. 2001-343956 (published on Dec. 14, 2001)

DISCLOSURE OF INVENTION

However, in case where overshoot driving is performed in a conventional display apparatus performing sub frame display, in order to compensate the low response speed in all combinations of input grayscales in successive frames by overshoot driving, it is necessary to perform the overshoot driving in both the first-half sub frame and the second-half sub frame. Therefore, the following has conventionally been done: based on a combination of the input image signal of the (N−1)-th frame (N is an integer not less than 2) and the input image signal of the N-th frame, the input signal of the N-th frame is converted to an image signal for the overshoot driving, and the image signal for the first half frame and the image signal for the second-half sub frame are generated based on the image signal generated by the conversion. However, the conventional technology is disadvantageous in that there is a time lag between the input of the image signal into the display-apparatus and actual image display, and the cost of the frame memory storing the image signal is high.

Now, the following will explain why overshoot driving is required in both of the first-half sub frame and the second-half sub frame, in case where the overshoot driving is performed in a conventional display apparatus conducting sub frame display.

FIG. 18(a)-FIG. 18(f) are graphs each of which shows the relationship between a voltage of an image signal applied to a liquid crystal element in case where overshoot driving is performed and the brightness level of the pixel, in conventional sub frame display in which driving is performed in such a manner that one frame is time-divided into a first-half sub frame and a second-half sub frame. In this example, the voltages applied in the first-half sub frame and the second-half sub frame are set in such a way as to increase a difference between the voltages applied in the respective sub frames as much as possible. In other words, a voltage is applied only in the first-half sub frame until the brightness level reaches a certain level, and a voltage is applied in the second-half sub frame only when the target brightness level is not attained even if the voltage applied in the first-half sub frame is set at the maximum voltage.

In FIG. 18(a)-FIG. 18(f), the bar charts indicate voltages applied in the respective sub frames, and shaded portions in the bar charts indicate voltages for overshoot driving. The curved lines in the graphs indicate brightness levels of the liquid crystal display apparatus. The dotted lines indicate brightness levels when overshoot driving is not performed, whereas the full lines indicate brightness levels when overshoot driving is performed.

FIG. 18(a) shows a case where image display at a low grayscale level is performed in the (N−1)-th frame, and then image display with a grayscale level slightly higher than the low grayscale level is performed in the N-th frame (i.e. rise from a low grayscale to a low grayscale). Similarly, FIG. 18(b)-FIG. 18(f) respectively show decay from a low grayscale to a low grayscale, rise from a high grayscale to a high grayscale, decay from a high grayscale to a high grayscale, rise from a low grayscale to a high grayscale, and decay from a high grayscale to a low grayscale.

In case of rise from a high grayscale to a high grayscale as shown in FIG. 18(c) and in case of rise from a low grayscale to a high grayscale as shown in FIG. 18(e), the maximum voltage is applied in the first-half sub frame. In these cases, a desired brightness level may not be attained in the first-half sub frame. Therefore, to compensate the insufficiency, overshoot driving is necessary in the second-half sub frame.

On this account, to compensate, by overshoot driving, a low response speed in all combinations of the brightness levels of the image signal in the (N−1)-th frame and the brightness levels of the image signal in the N-th frame, it is necessary to perform overshoot driving in both of the first-half sub frame and the second-half sub frame.

Now, the following will explain why, in a conventional display apparatus performing sub frame display, (i) there is a time lag between the input of the image signal into the display apparatus and actual image display, and (ii) the frame memory storing the image signal is expensive.

FIG. 16 is a block diagram showing an example of a controller LSI 100 for performing overshoot driving in a conventional display apparatus performing sub frame display. The controller LSI 100 performs a grayscale conversion process (overshoot) with respect to the input image signal supplied to the display apparatus in order to compensate an insufficient response and also performs a time division process.

As shown in the figure, the controller LSI 100 includes a timing controller 101, a memory controller 102, OS (overshoot) grayscale level conversion circuit 103, a memory controller 104, a first-half sub frame grayscale level conversion circuit 105, a second-half sub frame grayscale level conversion circuit 106, and a data selector 107.

The timing controller 101 generates a timing signal for controlling the memory controller 102, the memory controller 104, and the data selector 107. The controller LSI 100 subjects the input image signal to grayscale conversion for overshoot, based on the timing signal generated by the timing controller 101, and time-divides an input frame period of 60 Hz into two sub frames, i.e. into a first-half sub frame period and a second-half sub frame period.

The memory controller 102 controls the writing and read-out into/from the frame memory 121, and performs the following operations (1)-(3) based on the timing signal supplied from the timing controller 101.

(1) Writing an input image signal $F_N$ having a predetermined frame frequency (e.g. 60 Hz) into the frame memory 121.

(2) Transmitting the input image signal $F_N$ of the N-th frame to the OS grayscale level conversion circuit 103.

(3) Reading out an image signal $F_{N-1}$ of the (N−1)-th frame, which has been written into the frame memory 121, and transmitting the signal to the OS grayscale level conversion circuit 103.

To display an image of the N-th frame, using an LUT (Look Up Table) or the like, for each pixel, the OS grayscale level conversion circuit 103 outputs a grayscale level $F_{N\_OS}$ to the memory controller 104 to restrain the decrease in the moving image quality on account of an insufficient response of the image display panel 120, based on the grayscale level of the input image signal $F_N$ of the N-th frame and the grayscale level of the image signal $F_{N-1}$ of the (N−1)-th frame. In other words, the OS grayscale level conversion circuit 103 generates the image signal $F_{N\_OS}$ by converting the grayscale level of the image signal $F_N$ in the N-th frame so as to perform overshoot driving, when the response of the image display panel 120 will be insufficient if normal driving is carried out.

The memory controller 104 controls the writing and read-out into/from the frame memory 122, and performs the following operations (1) and (2), based on the timing signal supplied from the timing controller 101.

(1) Writing an image signal $F_{N\_OS}$ (with a predetermined frame frequency, e.g. 60 Hz) supplied from the OS grayscale level conversion circuit 103 into the frame memory 122.

(2) Twice reading out the image signal $F_{N\_OS}$ of the N-th frame, which has been written into the frame memory 122, at the frequency (e.g. 120 Hz) which is twice as much as the frame frequency at the time of the writing, sending the signal ($F_{N\_OS}(F)$) to the first-half sub frame grayscale level conversion circuit 105, and sending the signal ($F_{N\_OS}(R)$) to the second-half sub frame grayscale level conversion circuit 106.

The first-half sub frame grayscale level conversion circuit 105 converts the grayscale level of the image signal $F_{N\_OS}(F)$, which is supplied from the memory controller 104, into a grayscale level suitable for the first-half sub frame, so as to generate the image signal $F_N(F)$. The second-half sub frame grayscale level conversion circuit 106 converts the grayscale level of the image signal supplied from the memory controller 104 into a grayscale level suitable for the second-half sub frame, so as to generate the image signal $F_N(R)$.

In accordance with the timing signal supplied from the timing controller 101, the data selector 107 selects (i) the image signal $F_N(F)$ supplied from the first-half sub frame grayscale level conversion circuit 105, if an image signal corresponding to the first-half sub frame is to be output, or (ii) the image signal $F_N(R)$ supplied from the second-half sub frame grayscale level conversion circuit 106, if an image signal corresponding to the second-half sub frame is to be output, and the data selector 107 outputs the selected signal to the image display panel 120.

In this way, in the conventional display apparatus performing sub frame display, a grayscale level $F_{N\_OS}$ by which the reduction in the moving image quality due to an insufficient response of the image display panel 120 is generated, in accordance with the grayscale level of the image signal $F_N$ of the N-th frame and the grayscale level of the image signal $F_{N-1}$ of the (N−1)-th frame. Based on the generated grayscale level $F_{N\_OS}$, the image signal $F_N(F)$ for the first-half sub frame first-half sub frame and the image signal $F_N(R)$ for the second-half sub frame are generated. Therefore, there is a time lag between the input of the image signal $F_N$ of the N-th frame and the output of the display signal of the first-half sub frame and the display signal of the second-half sub frame to the image display panel 120 in a time division manner.

FIG. 17 illustrates the flow of data over time in the controller LSI 100. As shown in the figure, after the input of the image signal of the N-th frame, the image signal of the first-half sub frame and the display signal of the second-half sub frame are output to the image display panel 120 in a time division manner, and the display signal of the second-half sub frame is output after the output of the display signal of the first-half sub frame.

As shown in the figure, in the driving scheme above, there is a time lag more or less equivalent to one frame period occurs between the input of the image signal and the output of the display signal (constituted by plural sub frame display signals). When the vertical frequency (frame rate) of the image signal is 60 Hz, the time lag is about 16 ms.

When the display apparatus is used in a television receiver or the like, a time lag between the input of an image signal and the output of a display signal causes a displayed image to be out of sync with sound. Therefore, for example, a circuit for eliminating the out-of sync in sound is required. In case where the display apparatus is used as an image apparatus of a device such as a PC and a game console, which is required to promptly update the image display in response ton an input, image display seriously lags behind the input, and hence the operability is bad.

The aforesaid driving scheme requires the frame memory 121 for storing the input image signal of the (N−1)-th frame and the frame memory 122 for storing the image signal to which overshoot has been performed and reading out the stored image signal in the display period of each sub frame so as to perform time division. In short, two frame memories are required and hence the cost is high.

The present invention was done to solve the problem above, and an objective of the present invention is to provide a display apparatus which performs sub frame display and performs overshoot driving in the first sub frame of each frame so as to restrain the decrease in the moving image quality due to an insufficient response of an image display panel, for all combinations of brightness levels of the image signal of the current frame and the brightness levels of the image signal of the previous frame. Another objective of the present invention is to provide a display apparatus in which a time lag between the input of the image signal and actual display of the image is prevented, and the number of the frame memories is reduced.

To achieve the objective above, a control apparatus of a display apparatus of the present invention, which displays an image by time-dividing one frame of an input image signal into first to n-th (n is an integer not less than 2) sub frames, includes: signal generation means for generating first to n-th display signals for the first to n-th sub frames, respectively, in such a way that a total sum of brightness of a display screen of a display module in one frame is not changed by a division of the frame; and signal correction means for generating a corrected display signal in such a way that, to improve a response speed of a pixel in which a grayscale level of a first display signal of an N-th frame (N is an integer not less than 2), the first display signal being generated by the signal generation means, is changed for more than a predetermined value with respect to a grayscale level of an input image signal of an (N−1)-th frame, the grayscale of the first display signal for the pixel is corrected, the signal generation means for (i) adjusting the grayscale level of the first display signal within a range from either a minimum value or a value smaller than a first predetermined value to a second predetermined value which is smaller than a maximum value and setting grayscale levels of the second to n-th display signals to be values which are either identical with the minimum value or smaller than the first predetermined value when an image having low brightness is displayed, and (ii) setting the grayscale level of the first display signal at the second predetermined value and adjusting the grayscale levels of the second to n-th display signals, when an image having high brightness is displayed, and the signal correction means correcting the grayscale level of the first display signal within a range from either the minimum value or a value smaller than the first predetermined value to the maximum value.

In the arrangement above, the grayscale level of the first display signal before the correction in the signal correction means is smaller than the maximum value at least by 'maximum value minus second predetermined value'. When the first display signal is compensated (i.e. when overshoot is performed with respect to the first display signal), it is possible to use grayscale levels within the range from the minimum value or a value smaller the first predetermined value to the maximum value, the range including the range of the 'maximum value minus second predetermined value'. In other words, for the compensation of the first display signal, it is possible to use grayscale levels from the second predetermined value to the maximum value, according to the need. Therefore overshoot (compensation) with respect to the first display signal is suitably carried out even in the case of rise from a low grayscale to a high grayscale and rise from a high grayscale to a high grayscale. Because of this, the decrease in the moving image quality on account of an insufficient response of the display module is restrained by performing overshoot with respect to the display signal of the first sub frame, for all combinations of the grayscale levels of the input image signal of the (N−1)-th frame and the grayscale levels of the input image signal of the N-th frame.

In the arrangement above, furthermore, the grayscale level of the display signal of the first sub frame is arranged to be as high as possible within the range of not higher than the second predetermined value, whereas the output grayscale levels of the second to n-th sub frames are arranged to be small. As a result of this, the light emission state of the pixel in each frame is brought close to impulse-type light emission such as a CRT, and hence the quality of moving images displayed on the display module is improved.

To achieve the objective above, a control apparatus of a display apparatus of the present invention, which displays an image by time-dividing one frame of an input image signal into first to n-th (n is an integer not less than 2) sub frames, includes: signal generation means for generating first to n-th display signals for the first to n-th sub frames, respectively, in such a way that a total sum of brightness of a display screen of a display module in one frame is not changed by a division of the frame; and signal correction means for generating a corrected display signal in such a way that, to improve a response speed of a pixel in which a grayscale level of a first display signal of an N-th frame (N is an integer not less than 2), the first display signal being generated by the signal generation means, is changed for more than a predetermined value with respect to a grayscale level of an input image signal of an (N−1)-th frame, the grayscale of the first display signal for the pixel is corrected, the signal generation means generating the first display signal from the input image signal without an intervention of a frame memory storing the input image signal, and generating display signals of the second to n-th sub frames by reading out the input image signal stored in the frame memory.

In the arrangement above, the first display signal is generated from the input image signal without the intervention of the frame memory storing the input image signal, and is output to the display module after being subjected to overshoot according to the need. This shortens a time lag between the input of the image signal into the driving control apparatus to the actual image display on the display module.

The aforesaid arrangement may be arranged so that the signal generation means (i) adjusts the grayscale level of the first display signal within a range from either a minimum value or a value smaller than a first predetermined value to a second predetermined value which is smaller than a maximum value and setting grayscale levels of the second to n-th display signals to be values which are either identical with the minimum value or smaller than the first predetermined value when an image having low brightness is displayed, and (ii) sets the grayscale level of the first display signal at the second predetermined value and adjusting the grayscale levels of the second to n-th display signals, when an image having high brightness is displayed, and the signal correction means corrects the grayscale level of the first display signal within a range from either the minimum value or a value smaller than the first predetermined value to the maximum value.

In the arrangement above, the decrease in the moving image quality on account of an insufficient response of the display module is restrained by performing overshoot with respect to the display signal of the first sub frame, for all combinations of the grayscale levels of the input image signal of the (N−1)-th frame and the grayscale levels of the input image signal of the N-th frame. Also, the light emission state of the pixel in each frame is brought close to impulse-type light emission such as a CRT, and hence the quality of moving images displayed on the display module is improved.

The aforesaid arrangement may be arranged so that the second predetermined value is arranged so that brightness when a voltage corresponding to a display signal at the second predetermined value is applied to the pixel and hence the pixel is at a static state is identical with brightness to which the pixel reaches in the first sub frame, when the pixel, which has been in the static state because of supply of a voltage corresponding to a display signal having a grayscale level which is at either the minimum value or a level lower than the first predetermined value, receives a voltage corresponding to a display signal having the maximum grayscale level, in the first sub frame.

In the arrangement above, since a grayscale level for suitably performing overshoot with respect to the display signal of the first sub frame is sufficiently secured, the decrease in the moving image quality on account of an insufficient response of the display module is suitably restrained for all combinations of the grayscale levels of the input image signal of the (N−1)-th frame and the grayscale levels of the input image signal of the N-th frame. Also, the light emission state of the pixel in each frame is brought close to impulse-type light emission such as a CRT, and hence the quality of moving images displayed on the display module is improved.

The aforesaid arrangement may be arranged to further include timing control means for generating a control signal which causes a display screen of a display module to perform image display using (i) the first display signal or the corrected display signal and (ii) the display signals of the second to n-th sub frames, the timing control means generating the control signal in such a way that (I) an image display period of a first sub frame of the N-th frame (N is an integer not less than 2) is arranged to partly overlap at least an image display period of a second sub frame of the N-th frame and an image display period of an n-th sub frame of the (N−1)-th frame so that a period during which a pixel voltage is written into all horizontal lines of the display screen in each sub frame is arranged to be identical with a period of inputting the image signal in one frame, and (II) a delay time from input of the image signal of the N-th frame to the horizontal lines to writing of the pixel voltage in the first sub frame of the N-th frame is arranged to be shorter than the half of one frame of the input image signal, and preferably to be shorter than 20% of the input image signal.

In the arrangement above, a time lag between the input of the image signal and the actual image display is arranged to be negligibly short. Therefore, there is no gap between a displayed image and sound in a case of a television receiver or the like, and hence a circuit for delaying sound or the like is unnecessary. Also, when the present display apparatus is used as a display apparatus for devices such as PC and game console, which are required to promptly update the screen in response to an input, it is possible to perform image display in which an influence of a time lag on operations is small.

The aforesaid arrangement may be arranged so that the second predetermined value is arranged so that the timing control section generates the control signal in such a way that pixel voltages corresponding to the respective display signals of the first to n-th sub frames are output for one horizontal line each time and in a time division manner, from a data signal line driving circuit of the display module, and selection signals are output from a scanning signal line driver circuit, in accordance with the output of the pixel voltages.

For example, in case where the number of the scanning signal lines is 100 and one frame is divided into two (first and second) sub frames, in the arrangement above, the data signal line driving circuit outputs, to each data signal line, a voltage corresponding to the display signal of the first sub frame of the N-th frame of each pixel corresponding to the first scanning signal line, and then outputs a voltage corresponding to the display signal of the second sub frame of the (N−1)-th frame of each pixel corresponding to the 51st scanning signal line, and then outputs a voltage corresponding to the display signal of the first sub frame of the N-th frame of each pixel corresponding to the second scanning signal line. In this way, display signals of respective sub frames are output line-by-line, in a time division manner.

In the meanwhile, in response to the output from the data signal line driving circuit, the scanning signal line driving circuit outputs a selection signal while serially (alternately in this case) switching a group of scanning signal line to be selected. The scanning signal lines are vertically grouped such that the first scanning signal line, the 51st scanning signal line, the second scanning signal line, the 52nd scanning signal line, an so on.

As a result, without using a display module whose display screen is divided and each sub screen can independently perform image display, it is possible to simultaneously perform image display operations of plural sub frames by virtually dividing the screen into two screens, using a typical display module whose screen is not divided.

To achieve the objective above, a display method of the present invention, for displaying an image by time-dividing one frame of an input image signal into first to n-th (n is an integer not less than 2) sub frames, includes the steps of: (i) generating first to n-th display signals for the first to n-th sub frames, respectively, in such a way that a total sum of brightness of a display screen of a display module in one frame is not changed by a division of the frame; and (ii) generating a corrected display signal in such a way that, to improve a response speed of a pixel in which a grayscale level of a display signal of a first sub frame of an N-th frame (N is an integer not less than 2), the display signal being generated by the step (i), is changed for more than a predetermined value with respect to a grayscale level of an input image signal of an (N−1)-th frame, the grayscale of the first display signal for the pixel is corrected, in the step (i), (a) adjusting the grayscale level of the first display signal being adjusted within a range from either a minimum value or a value smaller than a first predetermined value to a second predetermined value which is smaller than a maximum value and setting grayscale levels of the second to n-th display signals to be values which are either identical with the minimum value or smaller than the first predetermined value when an image having low brightness is displayed, and (b) the grayscale level of the first display signal being set at the second predetermined value and adjusting the grayscale levels of the second to n-th display signals, when an image having high brightness is displayed, and in the step (ii), the grayscale level of the first display signal being corrected within a range from either the minimum value or a value smaller than the first predetermined value to the maximum value.

In the method above, the grayscale level of the first display signal before the correction in the step (ii) is smaller than the maximum value at least by 'maximum value minus second predetermined value'. When the first display signal is compensated (i.e. when overshoot is performed with respect to the first display signal), it is possible to use grayscale levels within the range from the minimum value or a value smaller the first predetermined value to the maximum value, the range including the range of the 'maximum value minus second predetermined value'. In other words, for the compensation of the first display signal, it is possible to use grayscale levels from the second predetermined value to the maximum value, according to the need. Therefore overshoot (compensation)

with respect to the first display signal is suitably carried out even in the case of rise from a low grayscale to a high grayscale and rise from a high grayscale to a high grayscale. Because of this, the decrease in the moving image quality on account of an insufficient response of the display module is restrained by performing overshoot with respect to the display signal of the first sub frame, for all combinations of the grayscale levels of the input image signal of the (N−1)-th frame and the grayscale levels of the input image signal of the N-th frame.

In the method above, furthermore, the grayscale level of the display signal of the first sub frame is arranged to be as high as possible within the range of not higher than the second predetermined value, whereas the output grayscale levels of the second to n-th sub frames are arranged to be small. As a result of this, the light emission state of the pixel in each frame is brought close to impulse-type light emission such as a CRT, and hence the quality of moving images displayed on the display module is improved.

To achieve the objective above, a display method of the present invention, for displaying an image by time-dividing one frame of an input image signal into first to n-th (n is an integer not less than 2) sub frames, includes the steps of: (i) generating first to n-th display signals for the first to n-th sub frames, respectively, in such a way that a total sum of brightness of a display screen of a display module in one frame is not changed by a division of the frame; and (ii) generating a corrected display signal in such a way that, to improve a response speed of a pixel in which a grayscale level of a first display signal of an N-th frame (N is an integer not less than 2), the first display signal being generated by the signal generation means, is changed for more than a predetermined value with respect to a grayscale level of an input image signal of an (N−1)-th frame, the grayscale of the first display signal for the pixel is corrected, in the step (i), the first display signal being generated from the input image signal without an intervention of a frame memory storing the input image signal, and display signals of the second to n-th sub frames being generated by reading out the input image signal stored in the frame memory.

In the method above, the first display signal is generated from the input image signal without the intervention of the frame memory storing the input image signal, and is output to the display module after being subjected to overshoot according to the need. This shortens a time lag between the input of the image signal into the driving control apparatus to the actual image display on the display module.

The aforesaid method may be arranged so that, in the step (i), (a) the grayscale level of the first display signal is adjusted within a range from either a minimum value or a value smaller than a first predetermined value to a second predetermined value which is smaller than a maximum value and setting grayscale levels of the second to n-th display signals to be values which are either identical with the minimum value or smaller than the first predetermined value when an image having low brightness is displayed, and (b) the grayscale level of the first display signal is set at the second predetermined value and adjusting the grayscale levels of the second to n-th display signals, when an image having high brightness is displayed, and in the step (ii), the grayscale level of the first display signal is corrected within a range from either the minimum value or a value smaller than the first predetermined value to the maximum value.

In the method above, the decrease in the moving image quality on account of an insufficient response of the display module is restrained by performing overshoot with respect to the display signal of the first sub frame, for all combinations of the grayscale levels of the input image signal of the (N−1)-th frame and the grayscale levels of the input image signal of the N-th frame. Also, the light emission state of the pixel in each frame is brought close to impulse-type light emission such as a CRT, and hence the quality of moving images displayed on the display module is improved.

To achieve the objective above, a display apparatus of the present invention includes one of the aforesaid driving control apparatuses and a display module whose driving is controlled by the driving control apparatus. Also, A display monitor may be constructed by combining the display apparatus with signal input means which transmits an externally-input image signal to the display apparatus. Furthermore, the display apparatus may be used as a display apparatus of a television receiver.

BRIEF DESCRIPTION OF DRAWINGS

FIG. 1(a) illustrates how display signals for a first-half sub frame and for a second-half sub frame, respectively, are generated in a display apparatus of an embodiment of the present invention.

FIG. 1(b) illustrates how display signals for the first-half sub frame and for the second-half sub frame, respectively, are generated in the display apparatus of the embodiment of the present invention.

FIG. 1(c) illustrates how display signals for the first-half sub frame and for the second-half sub frame, respectively, are generated in the display apparatus of the embodiment of the present invention.

FIG. 1(d) illustrates how display signals for the first-half sub frame and for the second-half sub frame, respectively, are generated in the display apparatus of the embodiment of the present invention.

FIG. 1(e) illustrates how display signals for the first-half sub frame and for the second-half sub frame, respectively, are generated in the display apparatus of the embodiment of the present invention.

FIG. 1(f) illustrates how display signals for the first-half sub frame and for the second-half sub frame, respectively, are generated in the display apparatus of the embodiment of the present invention.

FIG. 18(a) illustrates how display signals for a first-half sub frame and for a second-half sub frame, respectively, are generated in the conventional display apparatus shown in FIG. 16.

FIG. 18(b) illustrates how display signals for the first-half sub frame and for the second-half sub frame, respectively, are generated in the conventional display apparatus shown in FIG. 16.

FIG. 18(c) illustrates how display signals for the first-half sub frame and for the second-half sub frame, respectively, are generated in the conventional display apparatus shown in FIG. 16.

FIG. 18(d) illustrates how display signals for the first-half sub frame and for the second-half sub frame, respectively, are generated in the conventional display apparatus shown in FIG. 16.

FIG. 18(e) illustrates how display signals for the first-half sub frame and for the second-half sub frame, respectively, are generated in the conventional display apparatus shown in FIG. 16.

FIG. 18(f) illustrates how display signals for the first-half sub frame and for the second-half sub frame, respectively, are generated in the conventional display apparatus shown in FIG. 16.

BEST MODE FOR CARRYING OUT THE INVENTION

The following will explain an embodiment of the present invention. A display apparatus 1 of the present invention (hereinafter, present display apparatus) carries out the driving with time-division of a single frame into sub frames, and carries out overshoot (OS) driving to compensate a low response speed, in accordance with a combination of input grayscales in successive frames. In this display apparatus, moreover, a time lag between an input of an image signal and image display is short and a frame memory in which the input image signal is stored is low-cost.

The present display apparatus can be suitably used, for example, as a television receiver or a display monitor connected to a personal computer. Examples of television broadcasts that television receivers receive include terrestrial television broadcasts, broadcasts using satellites, such as BS (Broadcasting Satellite) digital broadcasts and CS (Communication Satellite) digital broadcasts, and cable television broadcasts.

Figure 2:
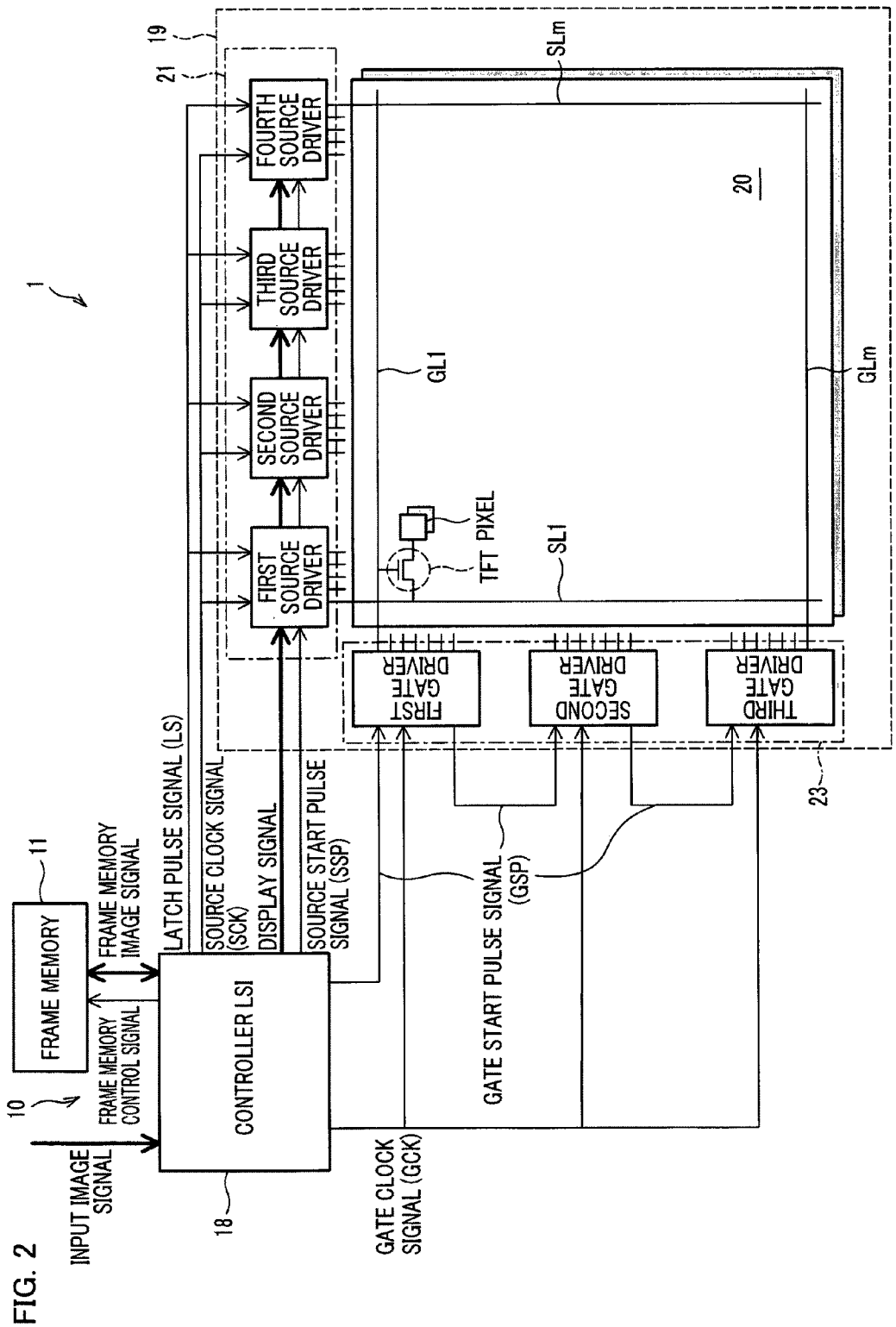
FIG. 2 is a block diagram showing a substantial part of the display apparatus of the embodiment of the present invention.

FIG. 2 is a block diagram showing a substantial part of the present display apparatus. As shown in this figure, the present display apparatus includes a display module 19 and a control apparatus (driving control apparatus) 10. The display module 19 is chosen from hold-type display modules such as an EL display module and a liquid crystal display module. In the present display apparatus, the display module 19 is a liquid crystal display module.

The display module 19 includes a pixel array 20 with plural pixels provided in a matrix manner. The pixels are provided at the intersections between source signal lines (data signal lines) SL1-SLn and gate signal lines (scanning signal lines) GL1-GLm. Along with the pixel, an active element is provided at each intersection. To each pixel (more precisely, to each pixel electrode), a voltage having been applied to a corresponding source signal line SL is supplied, during a period in which a corresponding gate signal line GL is selected by an active element (TFT in the figure).

Around the pixel array 20, there are a source driver section (data signal line driving circuit) 21 driving the source signal lines SL1-SLn and a gate driver section (scanning signal line driving circuit) 23 driving the gate signal lines GL1-GLm.

The gate driver section 23 outputs, to each of the gate signal lines GL1-GLm, a signal indicating a selection period, such as a voltage signal. In doing so, the gate driver section 23 selects a gate signal line GL to which the signal indicating the selection period is output, based on timing signals such as a gate clock signal GCK and a gate start pulse signal GSP which are control signals supplied from the control apparatus 10. In this manner, each of the gate signal lines GL1-GLm is selected and driven at a predetermined timing.

The gate driver section 23 of the present display apparatus has a clock skip mode in which the gate signal lines are not serially turned on at input timings of the gate clock GCK. In the clock skip mode, after a gate signal line GL is changed to active at one gate clock, the gate signal line of the next stage is changed to active at a gate clock which is input after g (g is an integer not less than 2) clocks are counted after the input of said one gate clock. This clock skip mode will be discussed later.

On the other hand, the source driver section 21 drives the source signal lines SL1-SLn so as to supply voltages indicated by display signals to the source signal lines SL1-SLn. In doing so, the source driver section 21 extracts the display signals which are input from the control apparatus 10 to the respective pixels in a time-division manner, by, for example, sampling the display signals at predetermined timings. The source driver section 21 then outputs, via the source signal lines SL1-SLn, an output signal corresponding to the display signal, to the pixel associated with the gate signal line GL having been selected.

In addition to the above, the source driver section 21 determines the timings of the sampling and the timings of the output of the output signals, based on timing signals such as a source clock signal SCK, a source start pulse signal SSP, and a latch pulse signal LS, which are control signals supplied from the control apparatus 10.

Each pixel in the pixel array 20 determines, when the corresponding gate signal line GL is selected, its brightness by adjusting the luminance, transmittance and the like when emitting light. The determination is made in accordance with an output signal supplied to the corresponding one of the source signal lines SL1-SLn.

In the present display apparatus, each of the source driver section 21 and the gate driver section 23 is constructed by cascading plural chips.

The source driver section 21 is constructed by cascading first to fourth source drivers each of which is constituted by a single chip. Each of the first to fourth source drivers drives n/4 of n source signal lines SL of the pixel array 20.

The display signal and the source start pulse signal SSP are supplied from the control apparatus 10 to the first source driver, and these signals are then passed to the second source driver, the third source driver, and the fourth source driver in this order. The source clock signal SCK and the latch pulse signal LS are supplied from the control apparatus 10 to first to fourth source drivers, in a shared manner.

The gate driver section 23 is constructed by cascading first to third gate drivers each of which is constituted by a single chip, and each of the first to third gate drivers drives 3/m of m gate signal lines GL of the pixel array 20.

The gate start pulse signal GSP is supplied from the control apparatus 10 to the first gate driver, and is then passed to the second gate driver and the third gate driver in this order. The gate clock signal GCK is supplied from the control apparatus 10 to the first to third gate drivers, in a shared manner.

The control apparatus 10 controls the display operation of the display module 19. Using an image signal (input image signal) and a control signal (input control signal) supplied from the outside, the control apparatus 10 outputs a display signal for driving the display module 19 and control signals such as the aforesaid source clock signal SCK and the source start pulse signal SSP.

The present display apparatus performs sub frame display so that one frame is time-divided into sub frames. Therefore, the control apparatus 10 generates a display signal supplied to the display module 19, as display signals for plural sub frames. The number of the sub frames in this case is 2, and the temporally earlier sub frame is termed a first-half sub frame (or first sub frame), whereas the temporally later sub frame is termed a second-half sub frame (second sub frame).

In addition to the above, the control apparatus 10 generates a display signal supplied to the display module 19 in such a manner that overshoot driving is performed in the first-half sub frame, in accordance with a combination of the grayscale levels of input image signals in successive frames.

Furthermore, in the present display apparatus, an image display period of the first-half sub frame of the N-th frame is arranged so as to partly overlap an image display period of the second-half sub frame of the N-th frame and an image display period of the second-half sub frame of the (N−1)-th frame, so that a period during which a pixel voltage is supplied to all horizontal lines of the display screen in each sub frame is identical with an image signal input period of one frame, during which period an image signal is input. Also, in the present display apparatus, a delay time from the input of the image signal in the N-th frame to each horizontal line to a time at which the pixel voltage is input to each horizontal line in the first-half sub frame of the N-th frame is shorter than the half of one frame period for the input image signal. As a preferable arrangement, in the present case, the delay time is shorter than 20% of one frame period for the input image signal. The control apparatus 10 generates and outputs control signals to achieve the aforesaid image display operation in the display module 19.

The number of sub frames is not limited to 2. For example, in case where the number of sub frames is 4, an image display period of the first sub frame of the N-th frame partly overlaps respective image display periods of the second sub frame of the N-th frame, the third sub frame of the N-th frame, the third sub frame of the (N−1)th frame, and the fourth sub frame (last-stage sub frame) of the (N−1)th frame. This may not hold true depending on the timings at which the respective sub frames start.

An image signal source from which the input image signal and the input control signals are supplied to the aforesaid control apparatus 10 is, for example, a tuner (image receiving means) which receives a television broadcast and generates an image signal representing an image transmitted by a television broadcast. In case where the present display apparatus is a display monitor, the image signal source is, for example, a personal computer.

Figure 3:
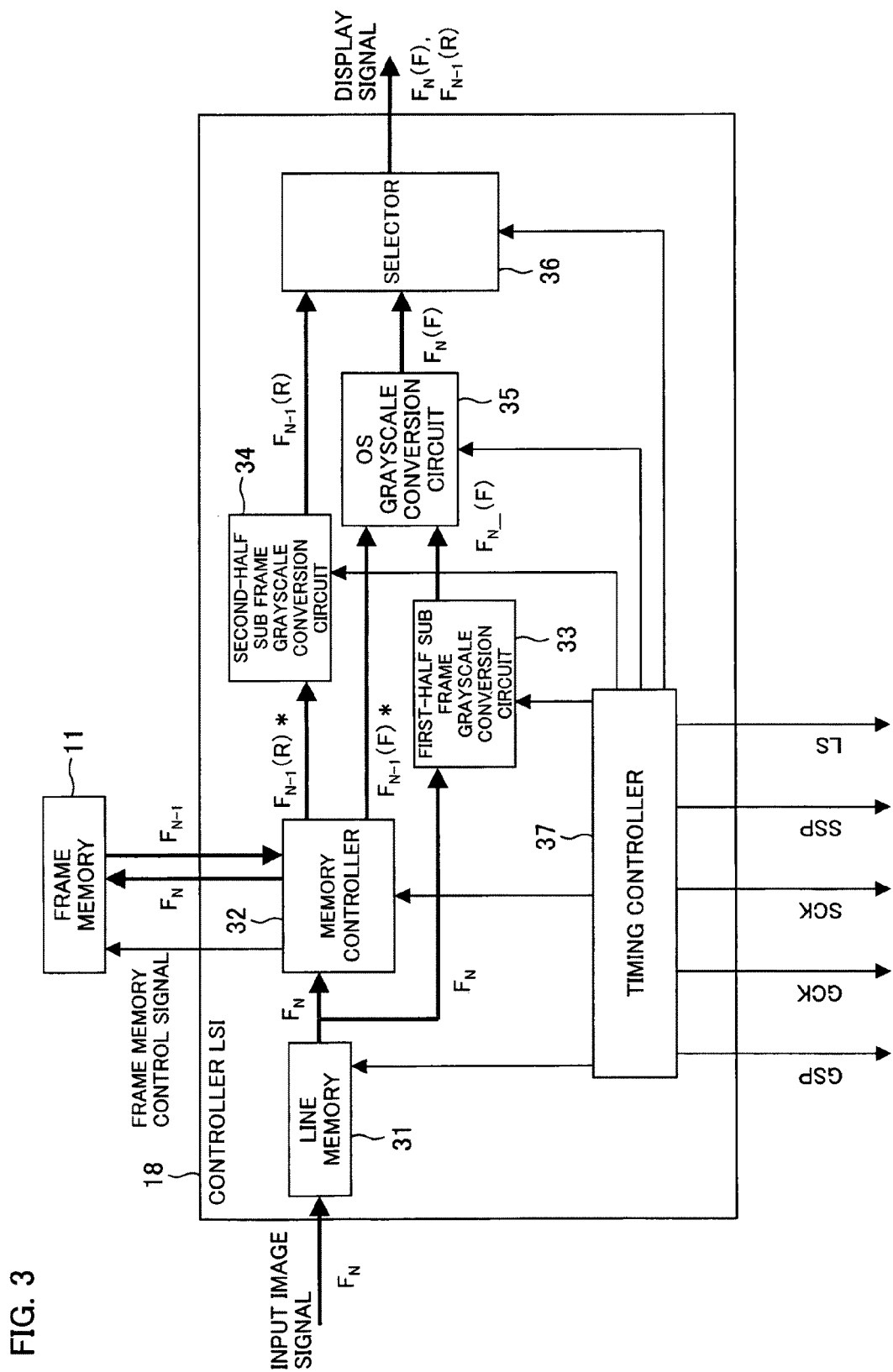
FIG. 3 shows an example of a controller LSI of the display apparatus of the embodiment of the present invention.

Now, details of the arrangement and the operation of the control apparatus 10 will be given. As shown in FIG. 2, the control apparatus 10 of the present display apparatus includes a frame memory 11 and a controller LSI 18. The controller LSI 18 includes, as shown in FIG. 3, a line memory 31, a memory controller 32, a first-half sub frame grayscale conversion circuit 33, a second-half sub frame grayscale conversion circuit 34, an OS grayscale conversion circuit 35, a data selector 36, and a timing controller 37.

The timing controller (timing control means) 37 generates timing signals for controlling the components of the controller LSI 18. Also, the timing controller 37 controls the output of the aforesaid control signals (such as the clock signal SCK, start pulse signal SSP, latch pulse signal LS, gate clock signal GCK, and gate start pulse signal GSP) supplied to the display module 19.

The image signal (input image signal) supplied from the image signal source is written, in a line-by-line (each of the horizontal lines) manner, into the line memory 31 on the input stage of the controller LSI 18. The image signal thus written is read out at the doubled transmission frequency for the sake of a time division transmission process later, and then the signal is transmitted to the first-half sub frame grayscale conversion circuit 33 and the memory controller 32. Operations such as the writing of the image signal into the line memory 31 and the readout of the image signal from the line memory 31 are controlled by the timing controller 37.

The memory controller (memory control section) 32 controls the writing and readout into/from the frame memory 11, and carries out the following operations (1)-(3) based on a timing signal input from the timing controller 37.

(1) An image signal $F_N$ read out from the line memory 31 is written into the frame memory 11, in a line-by-line manner.

(2) An image signal $F_{N-1}$ which has been written into the frame memory 11 is read out and sent to the second-half sub frame grayscale conversion circuit 34 (image signal $F_{N-1}(R)^*$), after a ½ frame has passed from the writing of the image signal into the frame memory 11.

(3) The image signal $F_{N-1}$ of the (N−1)-th frame, which has been written into the frame memory 11, is read out and sent to the OS grayscale conversion circuit 35 (image signal $F_{N-1}(F)^*$), after one frame has passed from the writing of the image signal into the frame memory 11.

The first-half sub frame grayscale conversion circuit (signal generation means) 33 generates an image signal $F_{N\_}(F)$ for the first-half sub frame in accordance with the input image signal $F_N$, in order to, for example, restrain motion blur, and outputs the generated signal to the OS grayscale conversion circuit 35. How this image signal is generated will be discussed later.

The OS grayscale conversion circuit (signal correction means) 35 generates, for each pixel, an image signal $F_N(F)$ for restraining the deterioration in the moving image quality on account of an insufficient response of the display module 19, based on the grayscale level of the image signal $F_{N\_}(F)$ input from the first-half sub frame grayscale conversion circuit 33 and the grayscale level of the input image signal $F_{N-1}(F)^*$ of the (N−1)-th frame, which is supplied from the memory controller 32. The OS grayscale conversion circuit then outputs the generated image signal to the data selector 36. In other words, in case where normal driving induces an insufficient response of the display module 19, the OS grayscale conversion circuit 35 generates the image signal $F_N(F)$ by converting the grayscale level of the image signal $F_{N\_}(F)$ in the first-half sub frame of the N-th frame, in such a way as to cause overshoot driving. In case where normal driving does not induce an insufficient response, the image signal $F_{N\_}(F)$ is output to the data selector 36, without any changes thereto. In what manner the image signal is generated will be discussed later.

The second-half sub frame grayscale conversion circuit (signal generation means) 34 generates, in order to, for example, restrain the motion blur, an image signal $F_{N\_-1}(R)$ for the second-half sub frame, from the input image signal $F_{N-1}(R)^*$ of the (N−1)-th frame. This input image signal is supplied from the memory controller 32. The second-half sub frame grayscale conversion circuit 34 then outputs the generated signal to the data selector 36. In what manner the image signal is generated will be discussed later.

Based on the timing signal supplied from the timing controller 37, the data selector 36 selects (i) the image signal $F_N(F)$ supplied from the OS grayscale conversion circuit 35, if an image signal corresponding to the first-half sub frame is to be output or (ii) the image signal $F_{N-1}(R)$ supplied from the second-half sub frame grayscale conversion circuit 34, if an image signal corresponding to the second-half sub frame is to be output. The data selector 36 then outputs the selected image signal to the display module 19.

Figure 4:
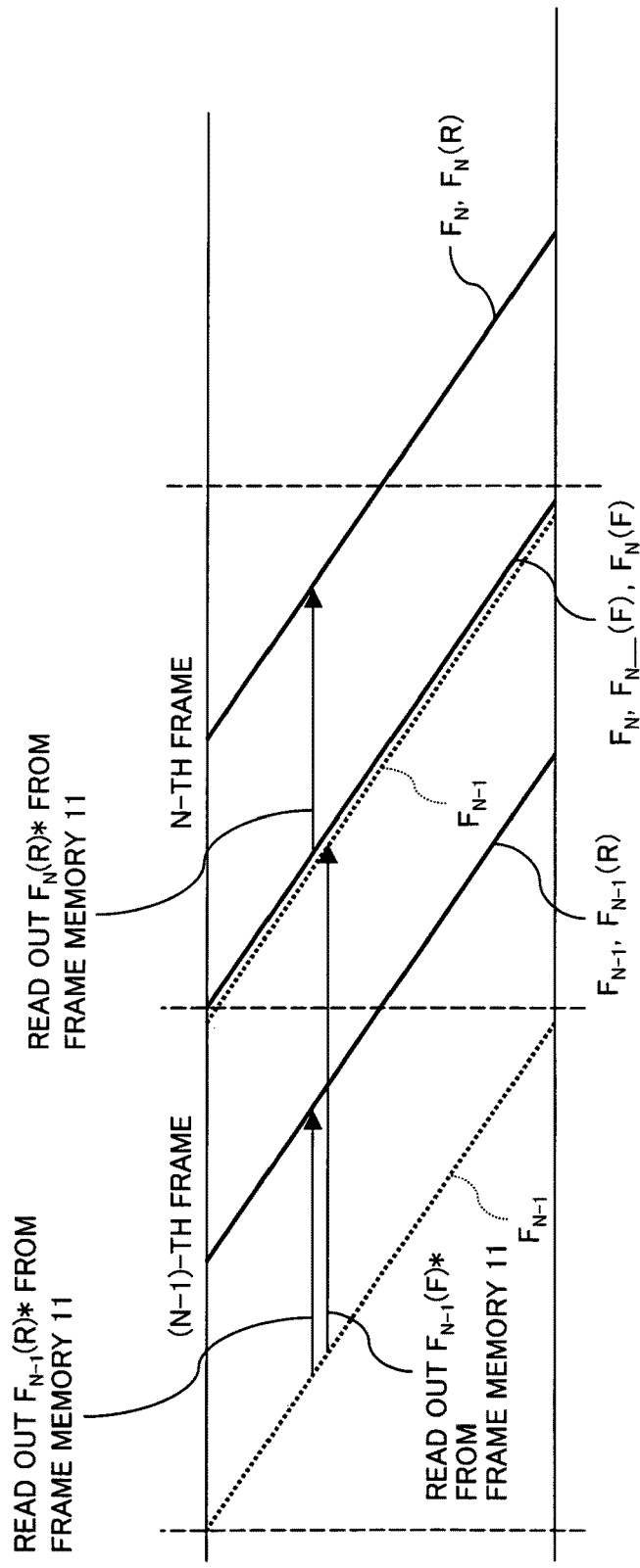
FIG. 4 illustrates relations among image signals on the time axis, in the display apparatus of the embodiment of the present invention.

FIG. 4 illustrates relations among the image signals on the time axis, which are dealt with in the control apparatus 10.

As shown in the figure, in the present display apparatus, an image in the N-th frame is constituted by image display (image signal $F_N(F)$) in the first-half sub frame and image display (image signal $F_N(R)$) in the second-half sub frame.

In response to the input of the image signal $F_N$ of the N-th frame, the first-half sub frame grayscale conversion circuit 33 generates the image signal $F_{N\_}(F)$ for the first-half sub frame, based on the image signal $F_N$. Furthermore, the OS grayscale conversion circuit 35 subjects the image signal $F_{N\_}(F)$ to grayscale conversion for overshoot driving so as to generate the image signal $F_N(F)$, based on the image signal $F_{N\_}(F)$ generated by the first-half sub frame grayscale conversion circuit 33 and the image signal $F_{N-1}(F)^*$ of the (N−1)-th frame, which is read out from the frame memory 11 (after one frame has passed from the input of the image signal $F_{N-1}$). The image signal $F_N(F)$ thus generated is selected by the data selector 36 at a timing corresponding to a timing signal supplied from the timing controller 37, and the data selector 36 outputs the selected signal to the display module 19.

As a result, in the present display apparatus, pixel voltages are written into the respective horizontal lines in the first-half sub frame of the N-th frame, with hardly any delay time from the input of the image signal of the N-th frame to the horizontal lines. In other words, in the present display apparatus, the timing controller 37 controls the operation timings of the components of the controller LSI 18 in such a way as to reduce the delay time as much as possible.

The input image signal $F_N$ of the N-th frame is written into the frame memory 11 by the memory controller 32, and then the signal is read out after a ½ frame and supplied to the second-half sub frame grayscale conversion circuit 34 (image signal $F_{N-1}(R)^*$). Thereafter, based on the image signal $F_{N-1}(R)^*$; the second-half sub frame grayscale conversion circuit 34 generates an image signal $F_N(R)$ for the second-half sub frame. The image signal $F_N(R)$ thus generated is selected by the data selector 36 at a timing corresponding to a timing signal supplied from the timing controller 37, and the data selector 36 outputs the selected signal to the display module 19.

As a result, in the present display apparatus, after the image signal of the N-th frame for the horizontal lines is input, pixel voltages are written into the respective horizontal lines in the second-half sub frame of the N-th frame, after a ½ frame has passed.

It is noted that the vertical display operation period of each sub frame is identical with the vertical input period (one frame period) of one frame of the input image signal. Also, image display in the first half of the first-half sub frame of the N-th frame (i.e. image signal $F_N(F)$) is carried out in parallel with the second half image display in the second-half sub frame of the (N−1)-th frame (i.e. image signal $F_{N-1}(R)$), which is directly preceding sub frame of the first half of the aforesaid first-half sub frame of the N-th frame. The image display in the second half of the first-half sub frame in the N-th frame is carried out in parallel to the first half image display of the second-half sub frame (image signal $F_N(R)$) of the N-th frame.

Figure 5:
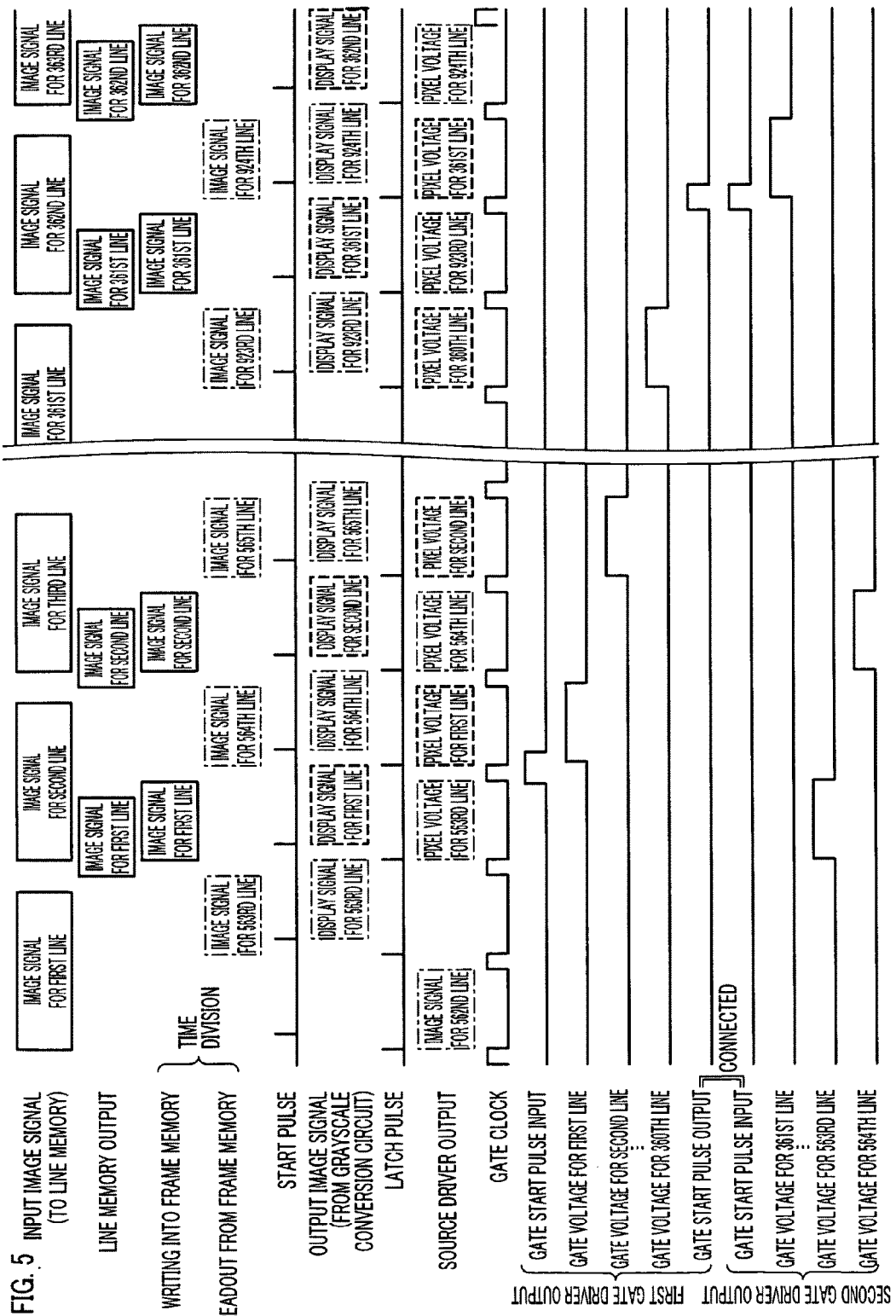
FIG. 5 is a timing chart showing the operation timings of the respective components, in the display apparatus of the embodiment of the present invention.
Figure 6A:
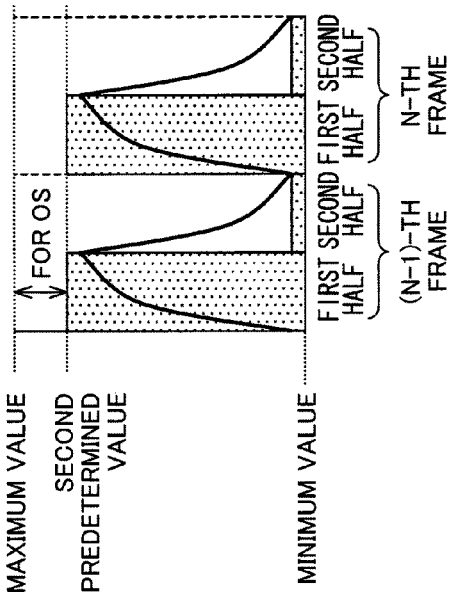
FIG. 6(a) illustrates display signals for the first-half sub frame and for the second-half sub frame, respectively, when no overshoot is performed in the display apparatus of the embodiment of the present invention.
Figure 6B:
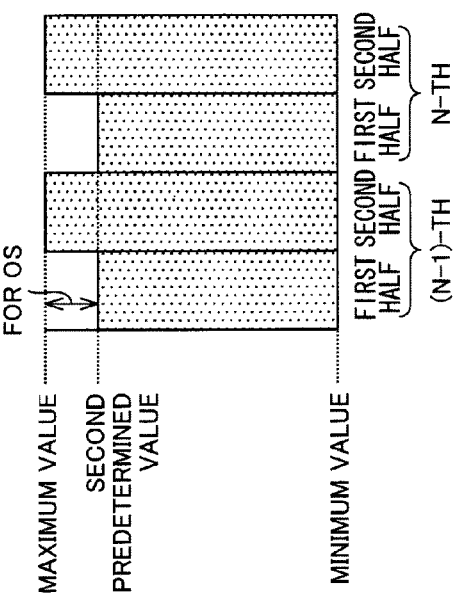
FIG. 6(b) illustrates display signals for the first-half sub frame and for the second-half sub frame, respectively, when no overshoot is performed in the display apparatus of the embodiment of the present invention.
Figure 6C:
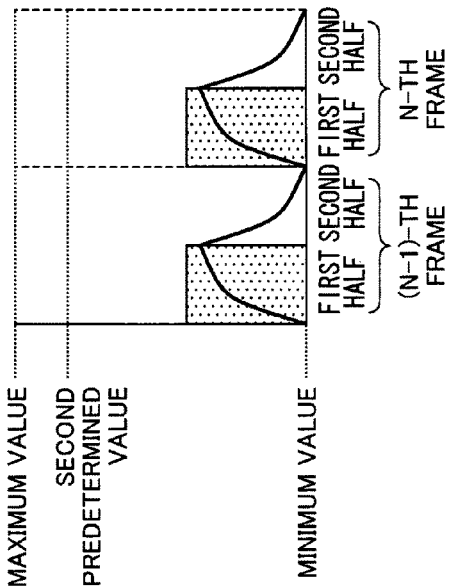
FIG. 6(c) illustrates display signals for the first-half sub frame and for the second-half sub frame, respectively, when no overshoot is performed in the display apparatus of the embodiment of the present invention.
Figure 6D:
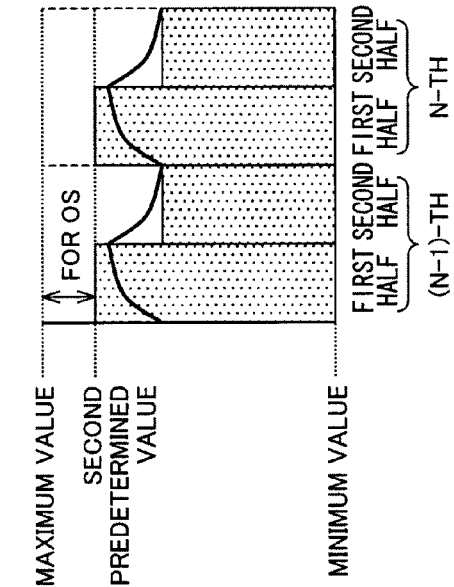
FIG. 6(d) illustrates display signals for the first-half sub frame and for the second-half sub frame, respectively, when no overshoot is performed in the display apparatus of the embodiment of the present invention.

FIG. 5 shows the operation timings of the sections of the control apparatus 10 and the source driver section 21 and the gate driver section 23 of the display module 19, when the display operation in the first-half sub frame of the N-th frame and the display operation in the second-half sub frame of the (N−1)-th frame are simultaneously carried out. This figure presupposes that one frame of the input signal is constituted by 1080 display lines (horizontal lines) and 45 vertical flyback time lines.

The controller LSI 18 in the control apparatus 10 outputs a source start pulse signal SSP to the source driver section 21 of the display module 19 so as to initialize the shift registers in the source driver section 21, and then the controller LSI 18 outputs a display signal for one line (for one horizontal line and for a gate signal line GL1) in sync with the source clock signal SCK. The display signal for one line, which has been output, is serially transmitted to and kept in the shift registers in the first to fourth source drivers which are cascaded.

Subsequently, when a latch pulse signal is supplied from the controller LSI 18, the grayscale value of each shift register in each source driver is converted into a pixel voltage and then output from a corresponding source signal line SL.

When the image signal of the first line in the N-th frame is input to the controller LSI 18, the first to fourth source drivers operate as above so as to output pixel voltages corresponding to the display signal for the pixel corresponding to the first line in the first-half sub frame of the N-th frame. In the present display apparatus, pixel voltages corresponding to the display signal for the pixel corresponding to the first line of the first-half sub frame of the N-th frame are output from the first to fourth source drivers, respectively, at a latch pulse which is two pulses later than the completion of the input of the image signal of the first line of the N-th frame.

When the controller LSI 18 outputs the gate start pulse signal GSP along with the gate clock signal GCK, immediately before the above, the first gate signal line GL1 which corresponds to the first line of the pixel array 20 connected to the first gate driver is switched to active, and the TFT of each of the pixels corresponding to the first gate signal line GL1 is turned on. As a result, the pixel voltages output from the respective source signal lines SL are input to the pixels so that the transmittance of the liquid crystal is updated, and the image display scanning for the first line is conducted.

In response to the output of the next gate clock GCK from the controller LSI, the first gate driver is switched to inactive. At this timing, the 564th gate signal line GL564 corresponding to the 564th line connected to the second gate driver is switched to active, and the source drivers output the pixel voltages for the pixels corresponding to the 564th line in the second-half sub frame of the (N−1)-th frame.

In response to the output of the next gate clock GCK, the 564th gate signal line GL564 connected to the second gate driver is switched to inactive, and the second gate signal line GL2 corresponding to the second line of the first gate driver is switched to active at this timing. As a result, the source drivers output pixel voltages to the pixels corresponding to the second line of the first-half sub frame of the N-th frame.

Thereafter, in a similar manner as above, the gate signal lines GL corresponding to the 565th line, the third lime, the 566th line, the fourth line, and so on are serially selected and pixel voltages are written into them. As a result, for the input image with the frame frequency of 60 Hz, display scanning is carried out with the frame frequency of 120 Hz (doubled speed), in the first-half and second-half sub frames . . . .

Subsequently, the following will describe a process to generate a display signal for sub frame in each of the grayscale conversion circuits (first-half sub frame grayscale conversion circuit 33, second-half sub frame grayscale conversion circuit 34, and OS grayscale conversion circuit 35) in the present display apparatus.

First, how a display signal for sub frame is generated in the first-half sub frame grayscale conversion circuit 33 and the second-half sub frame grayscale conversion circuit 34 will be discussed.

The first-half sub frame grayscale conversion circuit 33 includes a first-half LUT (look-up table) which is a correspondence table for converting an image signal into a display signal of the first-half sub frame. The second-half sub frame grayscale conversion circuit 34 includes a second-half LUT which is a correspondence table for converting an image signal into a display signal of the second-half sub frame.

FIG. 6(*a*) through FIG. 6(*d*) gives explanations on the values stored in the first-half LUT and the second-half LUT.

FIG. 6(*a*) shows an example of values of the display signals of the first-half sub frame and the second-half sub frame, when the grayscale of the input image signal is not higher than a predetermined first threshold (i.e. the brightness not higher than the brightness indicated by the image signal of the first threshold).

In this case, the grayscale level of the display signal of the second-half sub frame is set at a value falling within the range for dark display (i.e. the minimum value or a value smaller than the first predetermined value), and the grayscale level of the display signal of the first-half sub frame has a value corresponding to the grayscale value of the display signal and the grayscale value of the input image signal of the second-half sub frame, in other words, has a value at which the total sum of the brightness in the first-half sub frame and in the second-half sub frame is identical with the brightness indicated by the input image signal. To put it differently, in the present display apparatus, in case where the grayscale of the input image signal is not higher than the predetermined first threshold, the grayscale level of the display signal of the second-half sub frame is set at the minimum value or a value smaller than the first predetermined value, and the total sum of the brightness in the first-half sub frame and in the second-half sub frame is arranged to be identical with the brightness indicated by the input image signal, by adjusting the grayscale level of the display signal of the first-half sub frame. The range for dark display is grayscales not higher than a predetermined grayscale predetermined for dark display. When the grayscale predetermined for dark display corresponds to the minimum brightness, the range for dark display is a grayscale corresponding to the minimum brightness (i.e. black).

In case where the grayscale of the input image signal is at the first threshold, the grayscale level of the display signal of the first-half sub frame is set at a predetermined value (second predetermined value) smaller than the maximum value (falling in the range for bright display). This second predetermined value is, more specifically, a voltage equivalent to the brightness to which a pixel reaches in the sub frame, when the pixel which has been in a static state due to the supply of a voltage (for dark display) corresponding to a grayscale level smaller than the minimum value or the first predetermined value receives a voltage corresponding to the maximum value of the grayscale levels (maximum grayscale level). In other words, the second predetermined value is set so that the brightness of the pixel when the voltage corresponding to the second predetermined value is applied until the pixel becomes in a steady state is identical with the brightness to which the pixel reaches in the sub frame when the voltage corresponding to the maximum grayscale level is applied. The range of bright display is not lower than a grayscale predetermined for bright display. When the grayscale predetermined for bright display indicates the maximum brightness, the range of bright display is a grayscale corresponding to the maximum brightness (i.e. white).

FIG. 6(*b*) through FIG. 6(*d*) show an example of values of the display signals of the first-half sub frame and the second-half sub frame, when the grayscale of the input image signal indicates a brightness higher than the predetermined first threshold (i.e. brightness higher than the brightness indicated by the threshold).

In this case, the value of the display signal of the first-half sub frame is set at the second predetermined value, and the grayscale level of the display signal of the second-half sub frame has a value corresponding to the grayscale value of the display signal and the grayscale value of the input image signal in the first-half sub frame, i.e. has a value at which the total sum of the brightness of the first-half sub frame and the second-half sub frame is identical with the brightness indicated by the input image signal. To put it differently, in the present display apparatus, in case where the grayscale of the input image signal is higher than the first threshold, the grayscale level of the display signal of the first-half sub frame is set at the second predetermined value, and the total sum of the brightness of the first-half sub frame and the second-half sub frame is arranged to be identical with the brightness indicated by the input image signal, by adjusting the grayscale level of the display signal of the second-half sub frame.

In this manner, in order to realize impulse-type display without causing decrease in the contrast ratio, the first-half LUT and the second-half LUT store values by which an output grayscale level as large as possible within the range of not higher than the second predetermined value is provided in the first-half sub frame whereas a low output grayscale level is provided in the second-half sub frame. When the grayscale level of the input image signal is high, the grayscale level of the input image signal is provided to both of the sub frames. In doing so, a difference in the brightness integral values is maximized between a case where the input grayscale level is maximum and a case where the input grayscale level is minimum.

As a result, in case where an image signal for a pixel in a frame indicates a grayscale not higher than the aforesaid threshold, i.e. in a low brightness range, the degree of the brightness of the pixel in the frame is predominantly controlled by the degree of the grayscale level of the display signal of the first-half sub frame.

It is therefore possible to cause the display state of the pixel to be dark display, at least in the second-half sub frame of the frame. Therefore, when the grayscale of an image signal in a frame indicates a grayscale in the low brightness range, the light emission state of the pixel in the frame is brought close to the impulse-type light emission such as light emission by a CRT (Cathode-Ray Tube), and hence the quality of moving images displayed by the pixel array 20 is improved.

Figure 7A:
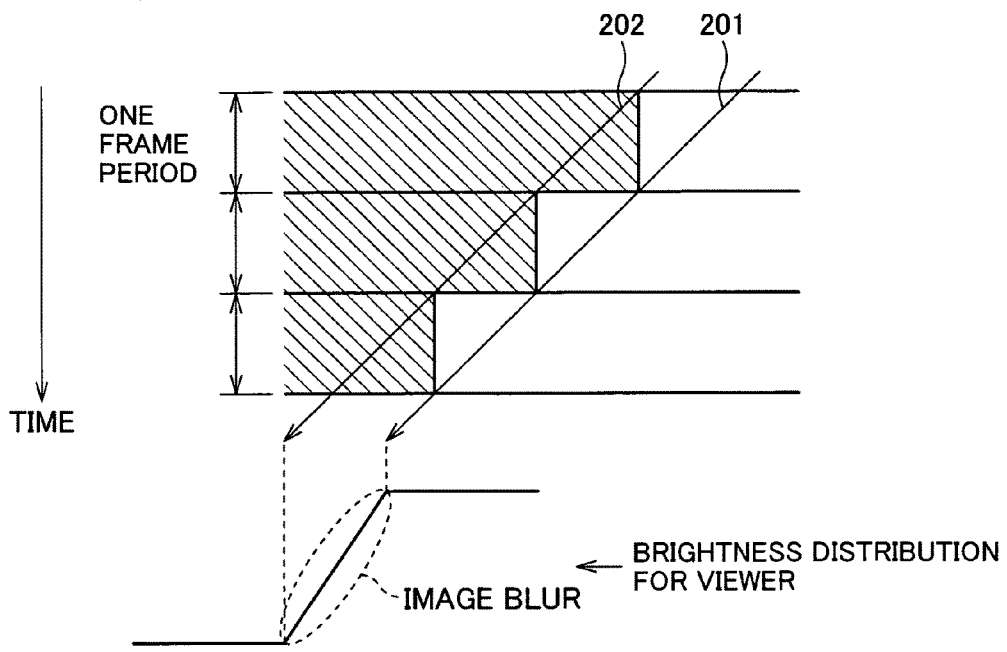
FIG. 7(a) shows why motion blur is restrained by impulse-type driving.
Figure 7B:
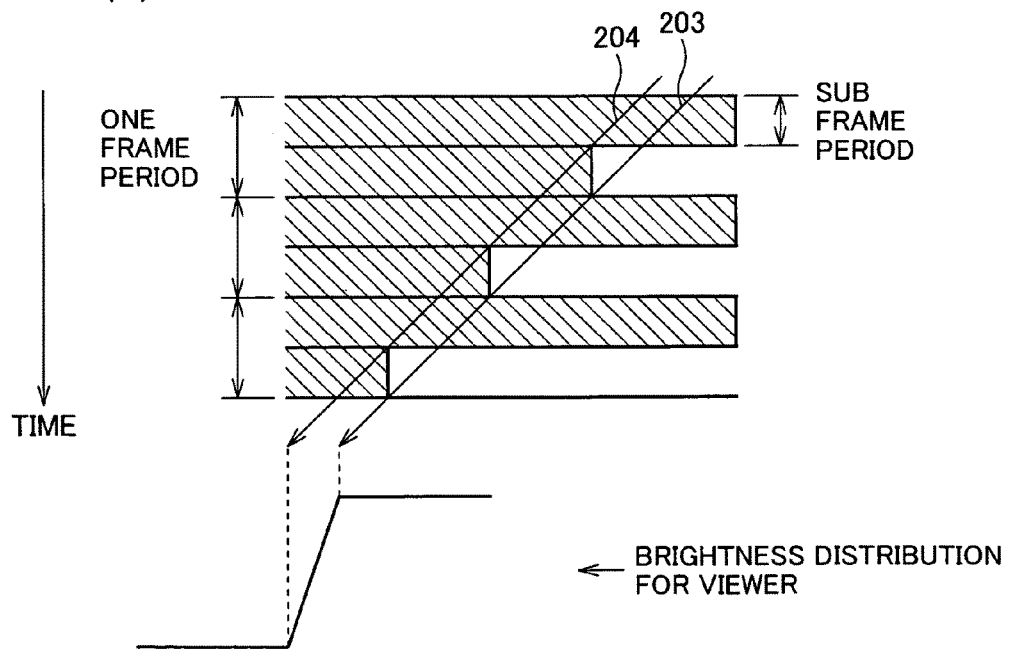
FIG. 7(b) shows why motion blur is restrained by impulse-type driving.

The following briefly explains why impulse-type driving restrains motion blur, with reference to FIG. 7(a) and FIG. 7(b).

FIG. 7(a) illustrates how the border between two areas which are different in brightness moves when hold-type display is carried out, assuming that the vertical axis indicates time whereas the horizontal axis indicates position. Similarly, FIG. 7(b) illustrates how the border between two areas which are different in brightness moves when impulse-type driving is carried out. In FIG. 7(b) showing the impulse-type driving, two sub frames are provided and the ratio therebetween is 1:1.

In case where the border moves in this manner, the line of sight of the viewer moves in line with the movement of the border. In FIG. 7(a), the lines of sight of the viewer are indicated by arrows 201 and 202. Around the aforesaid border, the distribution of brightness for the viewer is a time integral of the display brightness along the movement of the sight line. Therefore, in FIG. 7(a), the brightness in the area to the left of the arrow 202 is perceived to be identical with the brightness of the area to the left of the border, whereas the brightness in the area to the right of the arrow 201 is perceived to be identical with the brightness of the area to the right of the border. On the other hand, in the area between the arrows 201 and 202, the brightness is perceived so as to slightly increase. This area is perceived as motion blur.

Similarly, in the case of impulse-type driving shown in FIG. 7(b), in the distribution of brightness for the viewer around the border, motion blur occurs in the area between the arrows 203 and 204. However, since the gradient is steeper than the case of hold-type driving shown in FIG. 7(a), it is observed that motion blur is restrained.

As a result, when the image signal for a pixel in a frame indicates a grayscale of not higher than the aforesaid threshold, i.e. in a low brightness range, the degree of the brightness of that pixel in the frame is mainly determined by the degree of the value of the display signal of the first-half sub frame. On this account, the display state of the pixel is arranged to be dark display, at least in the second-half sub frame in the frame. Therefore, when the grayscale of an image signal in a frame is in a low brightness range, the light emission state of the pixel in the frame is brought close to impulse-type light emission such as that of a CRT (Cathode-Ray Tube), and hence the quality of moving images on the pixel array 20 is improved.

When the grayscale of an image signal to a pixel in a frame indicates a grayscale higher than the aforesaid threshold, i.e. in a high brightness range, the degree of the brightness of the pixel in the frame is mainly determined by the degree of the grayscale of the display signal of the second-half sub frame. Therefore, in comparison with the arrangement in which the brightness is substantially evenly distributed to the first-half sub frame and the second-half sub frame, it is possible to greatly differentiate the brightness of the pixel in the first-half sub frame from the brightness of the pixel in the second-half sub frame. As a result, when the grayscale of an image signal in a frame indicates a high brightness range, the light emission state of the pixel in the frame is brought close to impulse-type light emission in most cases, and hence the quality of moving images on the pixel array 20 is improved.

Now, the following will describe how overshoot driving with respect to a display signal for the first-half sub frame is carried out in the OS grayscale conversion circuit 35.

The OS grayscale conversion circuit 35 includes an OS LUT which is a correspondence table for converting an image signal $F_{N\_}(F)$ into an image signal $F_N(F)$ which is for restraining the decrease in the moving image quality due to an insufficient response of the display module 19, based on (i) the grayscale level of the image signal $F_{N\_}(F)$ supplied from the first-half sub frame grayscale conversion circuit 33 and (ii) the grayscale level of the input image signal $F_{N-1}(F)^*$ of the (N−1)-th frame supplied from the memory controller 32. In other words, the OS grayscale conversion circuit 35 includes an OS LUT which carries out overshooting with respect to the image signal $F_{N\_}(F)$ in such a way as to restrain the decrease in the moving image quality due to an insufficient response of the display module 19, in accordance with a combination of a grayscale level of the image signal $F_{N\_}(F)$ and a grayscale level of the image signal $F_{N-1}(F)^*$.

It is noted that, when there is a small difference between the grayscale level of the image signal $F_{N\_}(F)$ and the grayscale level of the image signal $F_{N-1}(F)^*$, the decrease in the moving image quality is not significant. On this account, if the difference is not higher than a predetermined value, the OS grayscale conversion circuit 35 does not use the OS LUT and outputs the image signal $F_{N\_}(F)$ to the data selector 36 of the subsequent stage, without making any changes to the signal.

FIG. 1(a)-FIG. 1(f) are graphs for giving explanations on the values stored in the OS LUT. In these figures, the bar charts indicate applied voltages in respective sub frames, and shaded portions in the bar charts indicate voltages for overshoot driving. The curved lines in the graphs indicate brightness levels of the pixel. The dotted lines indicate brightness levels when overshoot driving is not performed, whereas the full lines indicate brightness levels when overshoot driving is performed.

FIG. 1(a) shows an example in case where display with a low grayscale level is carried out in the (N−1)-th frame and then display with a slightly higher grayscale level is carried out in the N-th frame (i.e. rise from a low grayscale to a low grayscale). Similarly, FIG. 1(b)-FIG. 1(f) show decay from a low grayscale to a low grayscale, rise from a high grayscale to a high grayscale, decay from a high grayscale to a high grayscale, rise from a low grayscale to a high grayscale, and decay from a high grayscale to a low grayscale, respectively.

As shown in FIG. 18(c) and FIG. 18(e), overshoot in the second-half sub frame has conventionally been required in the cases of rise from a high grayscale to a high grayscale and rise from a low grayscale to a high grayscale.

On the other hand, in the present display apparatus, as shown in FIG. 1(c) and FIG. 1(e), overshoot is carried out in the first-half sub frame even in the cases of rise from a high grayscale to a high grayscale and rise from a low grayscale to a high grayscale, so that the decrease in the moving image quality due to an insufficient response of the display module 19 is restrained. In other words, in the present display apparatus, overshoot is carried out in the first-half sub frame for all combinations of the input image signals $F_{N-1}$ of the (N−1)-th frame and the image signals $F_N$ of the N-th frame, so that the decrease in the moving image quality due to an insufficient response of the display module 19 is restrained.

To carry out the aforesaid overshoot driving in the present display apparatus, it is necessary to set an OS LUT by calculating in advance grayscale level correction values for each of the combinations of the grayscale levels of the image signal $F_{N\_}(F)$ supplied from the first-half sub frame grayscale conversion circuit 33 and the grayscale levels of the input image signal $F_{N-1}(F)^*$ of the (N−1)-th frame supplied from the memory controller 32.

To calculate the grayscale level correction values, first, a temporal waveform of display brightness, which results from a variation of the grayscale level of the image signal supplied to the display module 19 in each frame or each sub frame, is calculated. Such a temporal waveform of the display rightness is obtained by simulation or measurement.

For example, in case where the pixel array 20 is a liquid crystal panel, simulation is carried out in accordance with the specifications such as a driving voltage which is output from the source driver section 21 to the pixel in response to a supplied grayscale level, the response characteristics of the liquid crystal element, and the panel structure. As a result of the simulation, it is possible to obtain a temporal waveform (brightness response waveform) of the display brightness, which results from a variation in the grayscale level of the image signal supplied to the display module 19 in each frame or in each sub frame.

Alternatively, a brightness response waveform of the display module 19 can be obtained in such a way that a brightness variation in one point or in a particular range in the screen is measured by an element such as a photodiode which converts in real-time a light receiving brightness into a voltage, and a device such as an oscilloscope which converts a measured voltage waveform into numerical data.

As the brightness response waveform is obtained in this way, a desirable grayscale level in each sub frame, for causing a brightness level at a point in each frame period or sub frame period to attain a desired level, is obtained by adjusting a grayscale level of the image signal supplied to the display module 19, while observing the brightness response waveform.

When the border of input grayscale levels moves on the screen, the brightness distribution waveform for the viewer who follows the movement is obtained either by calculating the brightness response waveform data by the aforesaid method or actually measuring the brightness distribution.

When the brightness distribution waveform appearing for the viewer is calculated, the brightness distribution waveform is obtained by temporally integrating the values of the plural points on the brightness response waveform obtained by the aforesaid method, in the direction in which the viewer follows the movement.

Figure 8:
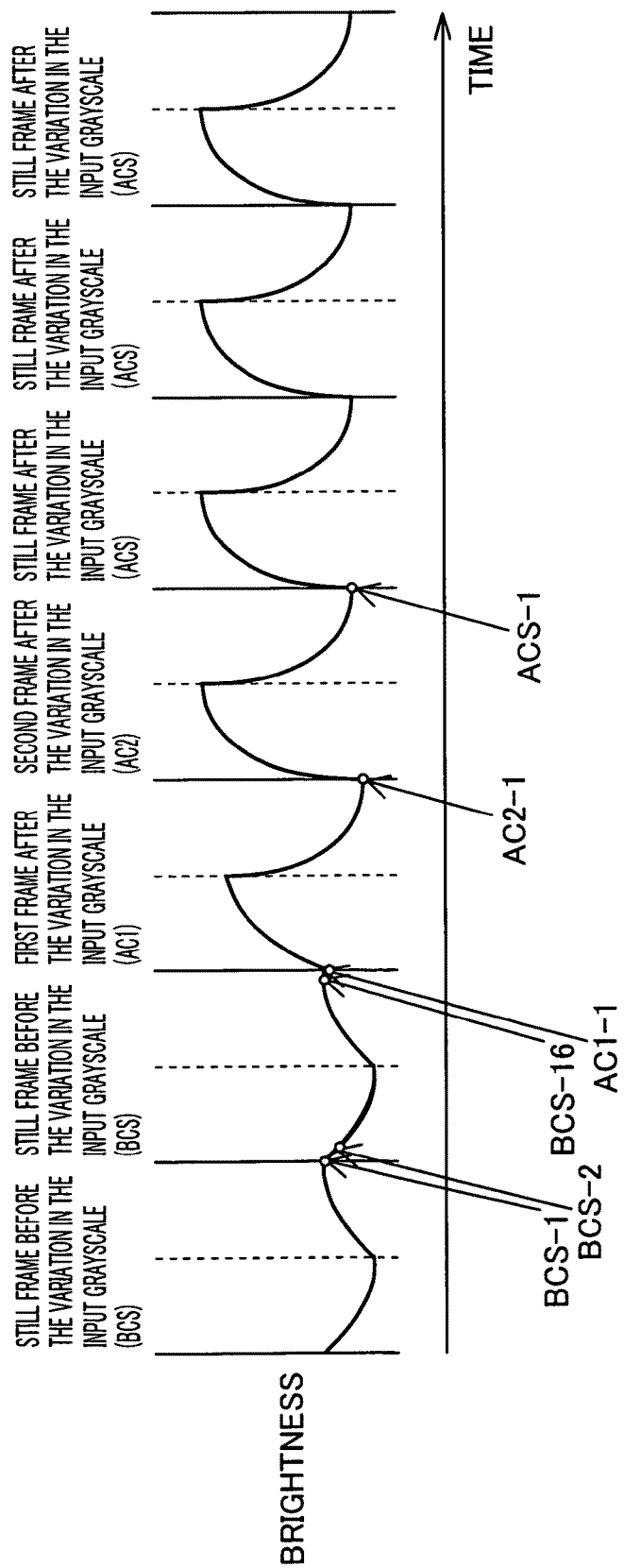
FIG. 8 is an waveform chart showing an example of a brightness response waveform in the display apparatus of the embodiment of the present invention.

For example, assume that the image display panel has a response speed characteristic such that after a variation in the input grayscale, the brightness response waveform becomes identical with the waveform at the time when the input image is static image after 2 frame periods have elapsed. In this case, first, from the brightness response waveform (see FIG. 8) obtained in the manner as above, N points (e.g. 16 points) of the waveform data in one frame period are obtained in each of the following frames: the still frame (BCS) before the variation in the input grayscale, the first frame (AC1) after the variation in the input grayscale, the second frame (AC2) after the variation in the input grayscale, and the still frame (ACS) after the variation in the input grayscale.

Figure 9:
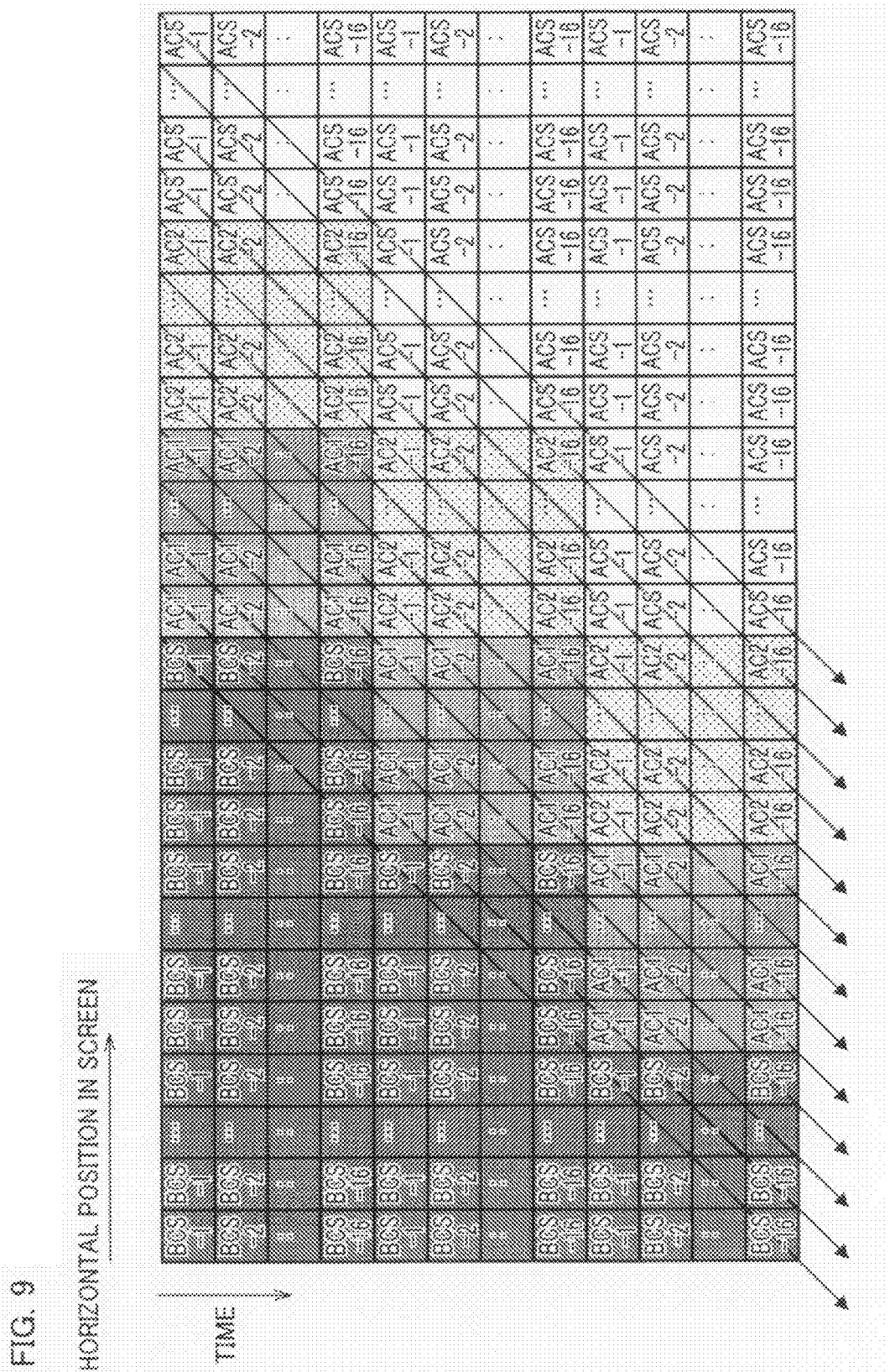
FIG. 9 is used for explaining in what manner a brightness distribution waveform for the viewer is worked out, and shows values of points obtained from brightness response waveform data.

Subsequently, the obtained points on the brightness response waveform data are lined up in such a way as to correspond to brightness variations at respective horizontal screen positions, assuming an image in which the border of two input grayscales moves (see FIG. 9). The points thus lined up are integrated in the direction in which the viewer follows the movement, and the result of the integration is divided by the number of the points. In doing so, assuming that the speed of the movement of the border is N (e.g. 16) which is identical with the number of the obtained points in one frame period, the result of the above can be calculated by integrating the obtained values in the respective points one by one in an oblique direction in the table shown in FIG. 9.

In this way, the brightness distribution waveform appearing for the viewer is obtained by calculating the integral values corresponding to the horizontal positions appearing for the viewer and plotting the values on a graph.

The brightness distribution waveform appearing for the viewer is obtained by the measurement, in the following manner. That is, an image in which the border between two input grayscales moves is actually displayed, and the brightness around the border is measured while a device such as a CCD (Charge-Coupled Device) which can measure the distribution of time integral values of the brightness in a particular area is either moved in parallel to the border or moved to follow the border. As a result of this, it is possible to obtain the brightness distribution waveform at and around the border between two input grayscales in a certain period of time.

Figure 10:
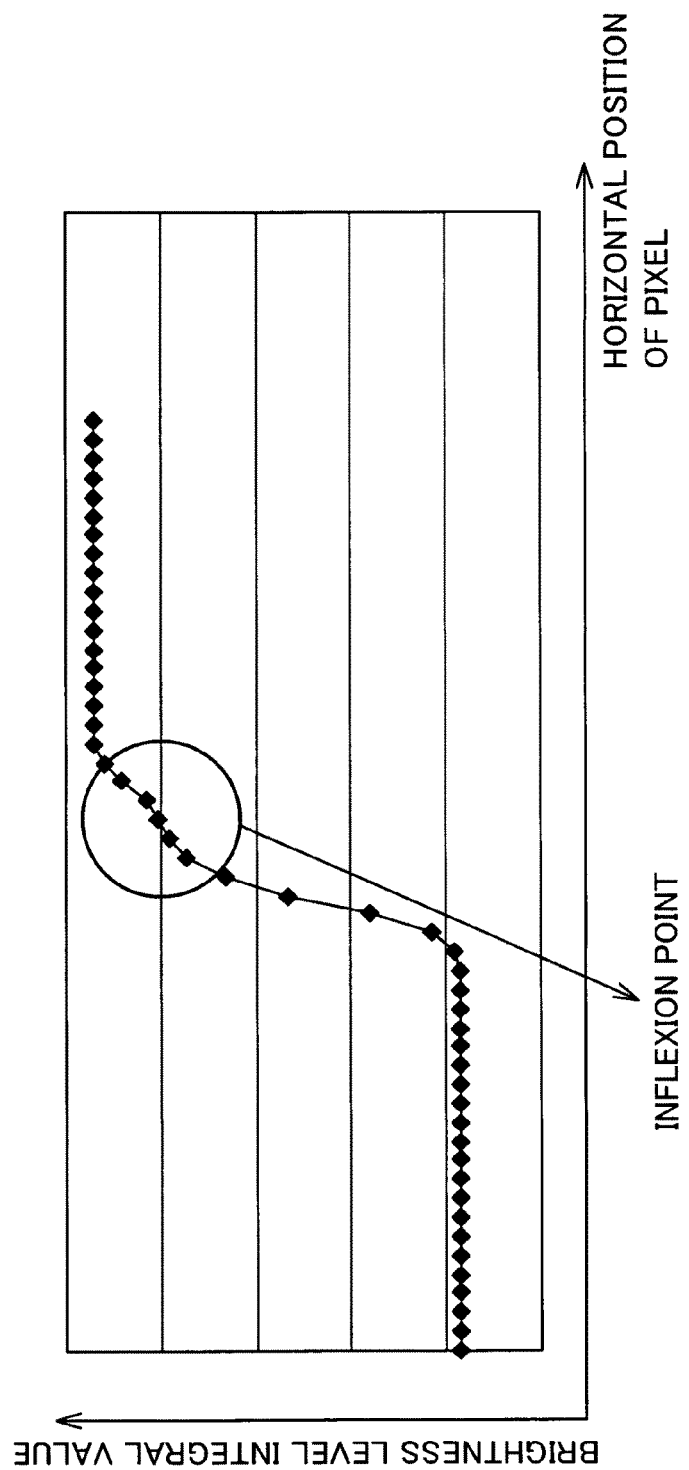
FIG. 10 is an waveform chart showing an example of a brightness distribution waveform for the viewer, in a display apparatus having display elements with a low response speed.
Figure 11:
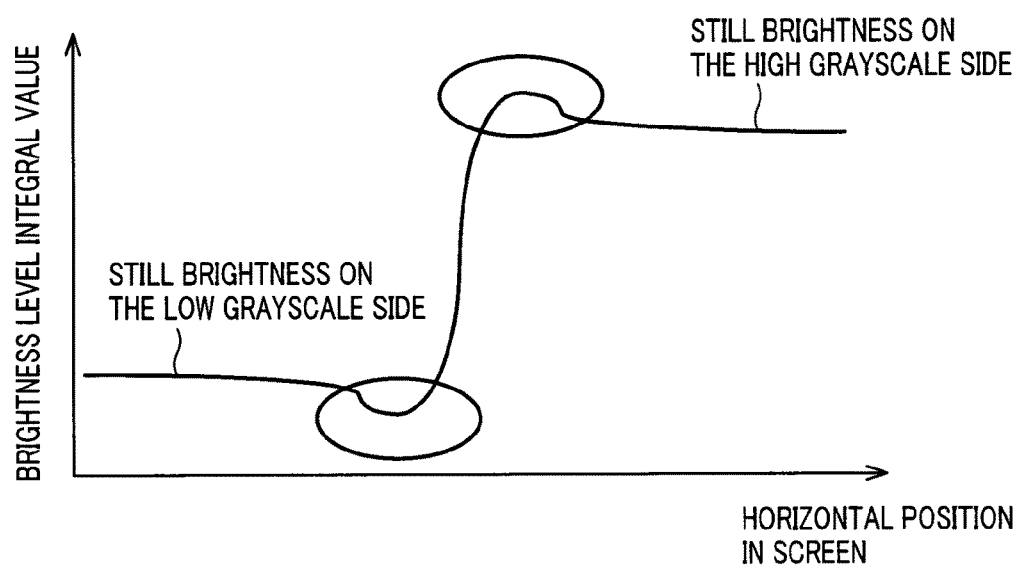
FIG. 11 is an waveform chart showing a brightness distribution waveform when a border of input grayscales moves and image display exceeding target brightness occurs around the border.
Figure 12:
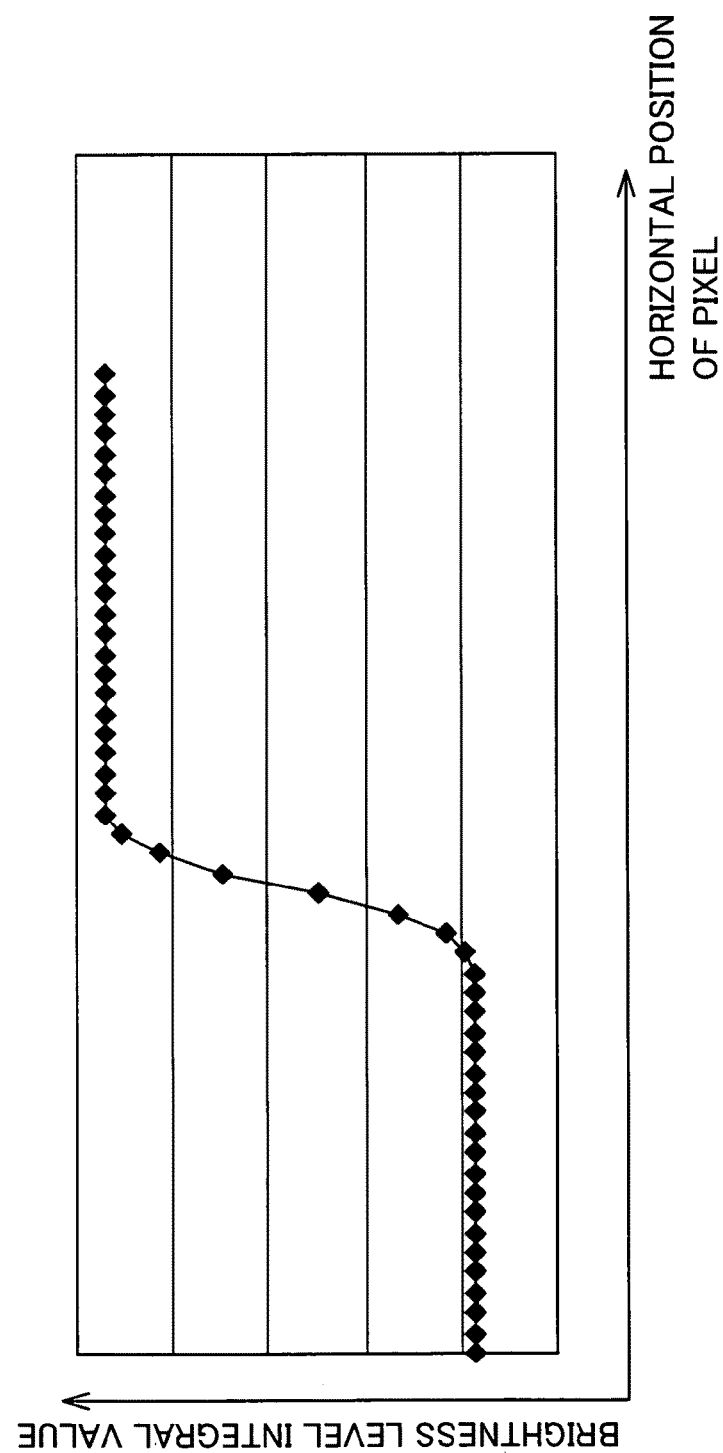
FIG. 12 is an waveform chart showing an optimum brightness distribution waveform around the border, when the border of the input grayscales moves.

The brightness distribution waveform obtained as a result of the above may have (i) an inflexion point in the middle of a curved line connecting two sets of still brightness as shown in FIG. 10 or (ii) a point lower than the still brightness on the low grayscale side or a point higher than the still brightness on the high grayscale side as shown in FIG. 11. An inflection point causes a false contour. Also, an integral brightness which is too high or too low as compared to still brightness may cause image quality deteriorations such as whitish appearance and blackened appearance. Therefore, it is possible to figure out a grayscale level at which an inflexion point and an integral brightness too high or low as compared to still brightness do not occur on the brightness distribution waveform, by adjusting the grayscale level of the image signal supplied to the display module 19, while feeding back the result of the observation of the brightness distribution waveform. Therefore, the grayscale level figured out as above (see FIG. 12) is, as an output grayscale level at the time of overshoot driving, set as a table setting value of the OS LUT in the OS grayscale conversion circuit 35.

Figure 13:
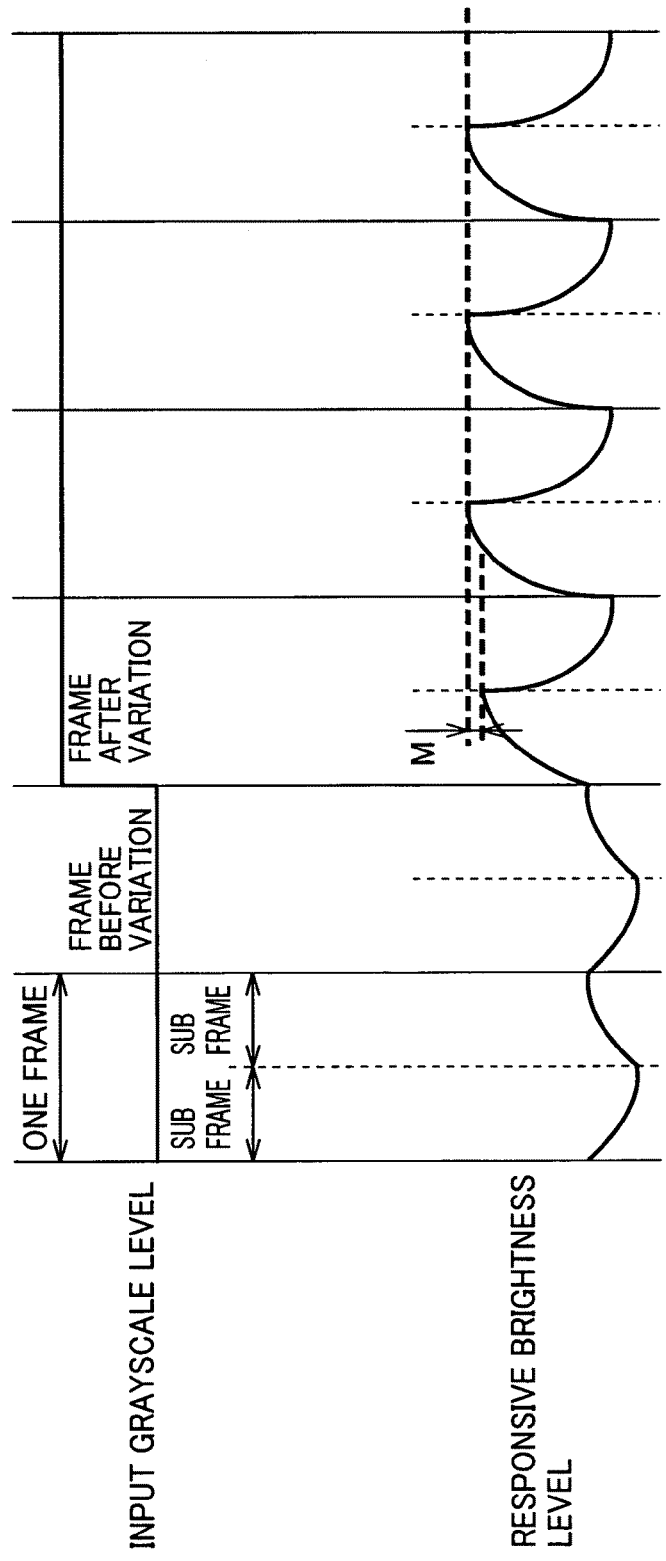
FIG. 13 is an waveform chart showing an example of a brightness response waveform in the display apparatus of the embodiment of the present invention.

In the OS grayscale conversion circuit 35, if all conversion grayscale values for all input grayscales are stored, the aforesaid grayscale correction can be performed for all input grayscales. However, to store all conversion grayscale values for all input grayscales, the capacity of the OS LUT must be very large, and hence the cost is increased. To solve this problem, for example, the number of input bits to the OS grayscale conversion circuit 35 is limited, and only conversion grayscale values calculated by measurement or calculation of some representative values are stored. This makes it possible to restrain the increase in the cost. In this case, there is a problem that to what degree of error is tolerable when a grayscale value which is not a representative value is input. A tolerable error may be set in such a way that a predetermined margin M is provided between a representative value and a brightness response level at the time of still image as shown in FIG. 13. The margin M is set after the first-half sub frame of the frame after the variation finishes.

In the present embodiment, the margin M is arranged to fall within an error range of not higher than 10% of the difference between the maximum brightness level and the minimum brightness level of the display module 19. In the present embodiment, the aforesaid error range is achieved in such a manner that the grayscale signals which are input in the (N−1)-th frame and the N-th frame to the OS grayscale conversion circuit 35 which is grayscale level conversion means at the time of overshoot driving are limited to upper 4 bits, ignoring the lower 4 bits of the original input grayscale signals, and only conversion values with respect to input grayscale variations from each of 16 grayscales are stored. This makes it possible to reduce a required capacity of the OS LUT as compared to a case where conversion grayscale values of all input grayscales are stored, and hence the cost for the circuit is restrained. It is noted that the LUT for the OS is not necessarily arranged in this manner.

Now, the following will describe the gate driver section 23 which makes it possible to perform the driving shown in FIG. 5.

The gate driver section 23 has a clock skip mode in which, after g (which is an integer not less than 2, g=2 in the explanation above) gate clocks have been counted after the gate clock at which the first gate signal line GL1 is changed to active, the second gate signal line GL2 of the subsequent stage is changed to active.

Therefore, by using this clock skip mode, it is possible to perform the driving such that, as shown in FIG. 5, the second gate signal line GL2 is changed to active after two gate clocks have been counted after the gate clock at which the first gate signal line GL1 is changed to active.

The gate driver section 23 is constituted by first to third gate drivers which are cascaded. With this arrangement, as indicated by the timing to output the gate start pulse GSP from the first gate driver to the second gate driver, which is shown in FIG. 5, the first gate driver causes the 360th gate signal line GL360 which is the last gate signal line GL to be active, then causes the gate signal line GL360 to be inactive at the next gate clock, and outputs the gate start pulse GSP to the second gate driver of the subsequent stage, at the gate clock directly subsequent to the gate clock at which the gate signal line GL 360 was changed to inactive.

With this arrangement, the gate signal line GL361, which is the first stage of the second gate driver, and the subsequent signal lines are changed to active at the timing of the gate clock directly subsequent to the gate clock at which the gate signal line GL360 of the preceding stage was changed to inactive. Therefore, in this gate driver clock skip mode, gate signal line control is serially performed as if the three connected gate drivers function as a single gate driver.

To deal with image display without sub frame division, each of the gate drivers constituting the gate driver section 23 is preferably arranged to be switchable between the aforesaid clock skip mode and the normal mode in which the second gate signal line GL2 is changed to active at the gate clock subsequent to the gate clock at which the first gate signal line GL1 is changed to active.

In each of the gate drivers constituting the gate driver section 23, g is preferably changeable. That is to say, g is determined in accordance with the number of sub frames. For example, g=2 if the number of sub frames is 2, and g=3 if the number of sub frames is 3. When g is switchable in this way, it is possible to deal with image displays with different numbers of sub frames.

Such a change in g may be performed by the user using a switch, in accordance with a display target image. Alternatively, in a case of a display apparatus in which the number of sub frames is set in accordance with a display target image, g may be switched in such a manner that the type of an input image signal is determined, the number of sub frames at the time of division of the input image signal is specified, and the switching is performed in accordance with the result of the specifying.

As discussed above, when one frame of an input image signal is time-divided into a first (first-half) sub frame and second to n-th (second-half) sub frames, the present display apparatus adjusts the grayscale level of the display signal of the first sub frame by setting the grayscale levels of the second to n-th sub frames at a grayscale level (which is a minimum value or a value smaller than a first predetermined value) for dark display, if the input image signal indicates low brightness (i.e. a grayscale lower than a first threshold). When the input image signal indicates high brightness (a grayscale higher than a first threshold), the grayscale level of the display signal in the first sub frame is set at a predetermined value (second predetermined value) and the voltages of the display signal in the second to n-th sub frames are adjusted. Therefore, the grayscale level of the display signal in the first sub frame is smaller than the maximum value by 'maximum value minus second predetermined value'.

In the present display apparatus, overshoot driving is performed with respect to the display signal of the first sub frame to increase the response speed of a pixel in which the grayscale level of the display signal in the N-th frame (N is an integer not less than 2), which signal is generated by the signal generation means, is changed for not less than a predetermined value with respect to the grayscale level of the input image signal of the (N−1)-th frame (in other words, the grayscale level of the display signal in the first sub frame is corrected).

With this, even in the case of rise from a low grayscale to a high grayscale or rise from a high grayscale to a high grayscale, the overshoot can be performed in the first sub frame by using the aforesaid grayscale of 'maximum value minus second predetermined value'. In other words, when overshoot is performed with respect to the display signal of the first sub frame, grayscale levels from the second predetermined value to the maximum value can be used according to need. Therefore, overshoot is performed in the first sub frame for all of the combinations of the grayscale levels of the input image signal in the (N−1)-th frame and the grayscale levels of the input image signal in the N-th frame, so that the deterioration in the moving image quality due to an insufficient response of the display module 19 is restrained.

In the present display apparatus, as described above, an output grayscale level which is as high as possible but is not higher than the second predetermined value is assigned to the first sub frame, whereas a low output grayscale level is assigned to the second to n-th sub frames. When the grayscale level of the input image signal is high, the grayscale level of the input image signal is distributed to respective sub frames. In doing so, a difference between the brightness integral value when the input grayscale level is maximal and the brightness integral value when the grayscale level is minimal is maximized.

With this, the light emission state of the pixel in each frame is brought close to impulse-type light emission such as that of a CRT, and hence the quality of moving images displayed by the display module 19 is improved.

In the present display apparatus, when the image signal of the N-th frame is supplied, the display signal of the first sub frame is generated from the input image signal without the intervention of the frame memory, whereas the display signals of the second to n-th sub frames are generated by reading out the input image signal from the frame memory. For a pixel in which a difference between (i) the image signal of the first sub frame, which is generated as above, and (ii) the image signal of the (N−1)-th frame, which has been stored in the frame memory, is larger than a predetermined value, overshoot is performed with respect to the display signal of the first sub frame of the pixel and the signal is output to the display module 19.

As a result of this, the display signal of the first sub frame is generated from the input image signal without the intervention of the frame memory storing the input image signal, and is output to the display module 19 after overshoot is carried out according to the need. This makes it possible to shorten the time lag between the input of the image signal and the actual display of the image.

That is to say, in a conventional display apparatus, as discussed above, an image signal to which overshoot is performed is generated in accordance with the input image signal of the N-th frame and the input image signal of the (N−1)-th frame, and the generated image signal is temporarily stored in the frame memory, then the signal is read out in the display period of the first-half sub frame and the display period of the second-half sub frame, and grayscale conversion for time division in each sub frame is performed and the signal is output. In this case, there is a time lag of not shorter than one frame period, between the input of the image signal and the actual display of the image.

On the other hand, in the present display apparatus, a period from the input of the image signal to the actual display of the image can be arranged to be shorter than the half of one frame period, preferably not longer than 20% of one frame period. Therefore, the image display operation for all pixels in the display screen in the first sub frame is very quickly performed and hence a time lag is negligible. Therefore, there is no gap between a displayed image and sound in a case of a television receiver or the like, and hence a circuit for delaying sound or the like is unnecessary. Also, when the present display apparatus is used as a display apparatus for devices such as PC and game console, which are required to promptly update the screen in response to an input, it is possible to perform image display in which an influence of a time lag on operations is small.

Also, the above-described conventional display apparatus requires (i) a frame memory for storing the input image signal of the (N−1)-th frame and (ii) a frame memory for storing the image signal to which overshoot is performed and for reading and the stored image signal in the display period of each sub frame and performing time division.

On the other hand, in the present display apparatus, the input image signal of the (N−1)-th frame is stored in the frame memory, and the input image signal is read out (i) when the display signal for the second-half sub frame is generated (½ frame after the input of the image signal of the (N−1)-th frame) and (ii) when overshoot is performed for the first-half sub frame (one frame after the input of the image signal of the (N−1)-th frame). Therefore, the number of required frame memory is only one.

In the present embodiment, the second predetermined value is set at a voltage equivalent to the brightness to which a pixel, which has received a voltage (for dark display) corresponding to the minimum value or a grayscale level smaller than a first predetermined value and is in a static state, reaches in the sub frame when a voltage equivalent to the maximum grayscale level is applied. However, the second predetermined value may be set differently. The second predetermined value is suitably set so that an insufficient response of the display module 19 is restrained in all combinations of the grayscale levels of the input image signal of the (N−1)-th frame and the grayscale levels of the input image signal of the N-th frame, by performing overshoot for the first-half sub frame. However, when the second predetermined value is too small, it is impossible to bring the light emission state of the pixel in each frame to be sufficiently close to impulse-type light emission. Therefore the second predetermined value is preferably sufficiently large so that an insufficient response of the display module 19 is restrained.

In the present embodiment, the grayscale level of the display signal of the first-half sub frame is increased in accordance with the increase in the grayscale, and when the grayscale level of the display signal of the first-half sub frame reaches a value (second predetermined value) which is calculated by subtracting the grayscales corresponding to the OS★OK ですfrom the maximum value, the grayscale scale level of the display signal of the second-half sub frame is increased. When the grayscale level of the display signal of the second-half sub frame reaches the maximum value, the grayscale level of the display signal of the first-half sub frame is increased using the remaining grayscales (grayscales equivalent to the difference between the maximum value and the second predetermined value). Not being limited to this arrangement, for example, the following scheme may be adopted: when the grayscale level of the display signal of the first-half sub frame reaches a value (second predetermined voltage) calculated by subtracting the grayscales corresponding to the OS from the maximum value, the grayscale level of the display signal of the second-half sub frame is increased, whereas, when the grayscale level of the display signal of the second-half sub frame reaches the grayscale level (second predetermined value) of the first-half sub frame, both the grayscale level of the display signal of the first-half sub frame and the grayscale level of the display signal of the second-half sub frame are increased using the remaining grayscales.

The present embodiment mainly deals with a case where one frame is time-divided into a first-half sub frame and a second-half sub frame. While not limited to this, one frame may be divided into three or more sub frames.

Figure 14:
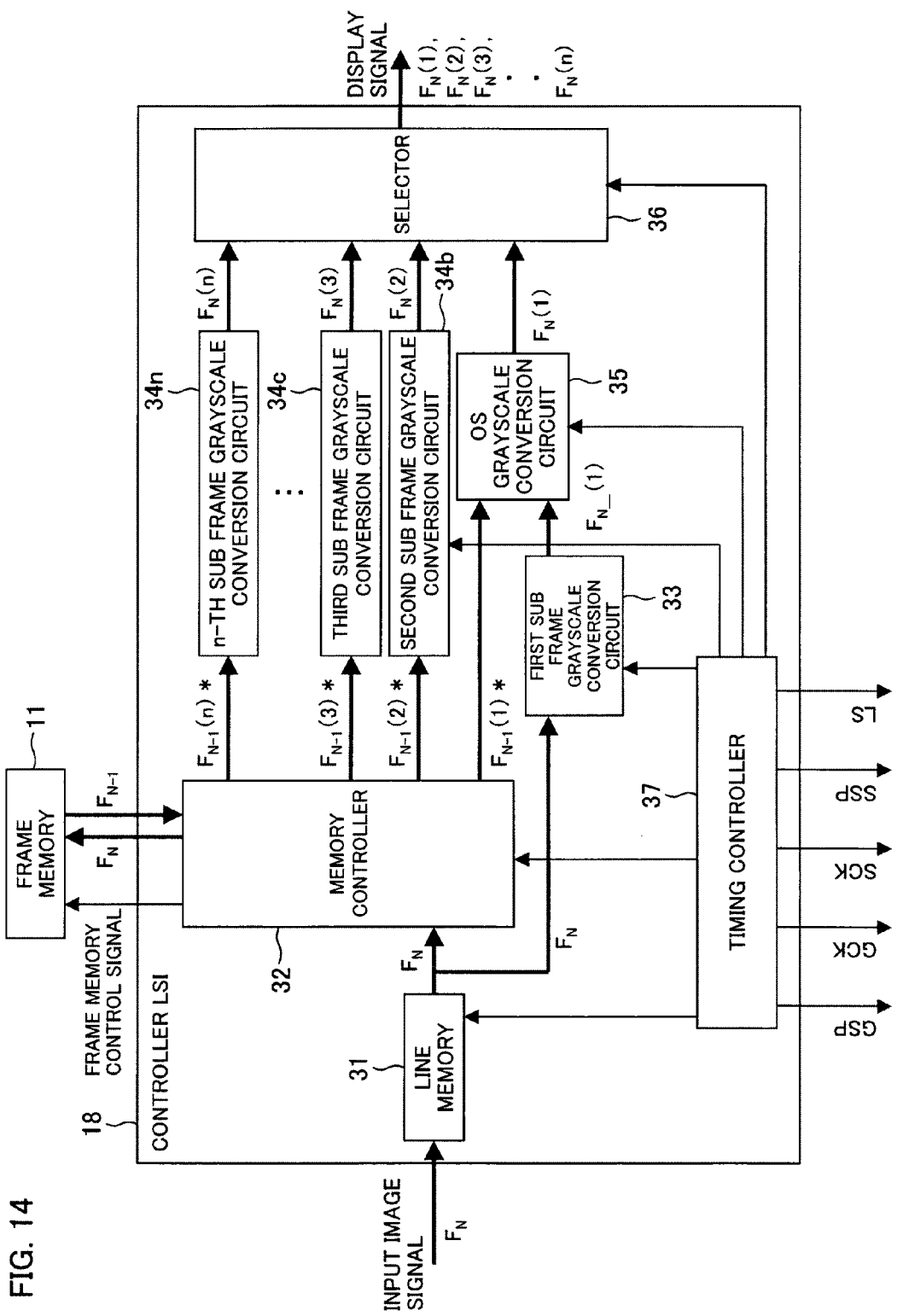
FIG. 14 is a block diagram showing an example of the controller LSI in the display apparatus of the embodiment of the present invention, in case where a single frame is divided into n sub frames.

FIG. 14 is a block diagram showing an example of a controller LSI 18 in case where one frame is time-divided into n sub frames. As shown in this figure, when one frame is time-divided into n sub frames, a first sub frame grayscale conversion circuit 33 and second to n-th sub frame grayscale conversion circuits (signal correction means) 34b-34n are provided.

The first sub frame grayscale conversion circuit 33 is substantially identical with the aforesaid first-half sub frame grayscale conversion circuit 33. The second to n-th sub frame grayscale conversion circuits 34b-34n are substantially identical with the aforesaid second-half sub frame grayscale conversion circuit 34. Being different from the above, however, each of these grayscale conversion circuits is provided with an LUT for generating a display signal for each sub frame from an input image signal.

Also, in this case, the timing controller 37 reads out the input image signal of the N-th frame from the frame memory 11, each time a 1/n frame period elapses from the input of the image signal, and output the signal to the second to n-th sub frame grayscale conversion circuits 34b-34n, respectively.

Figure 15:
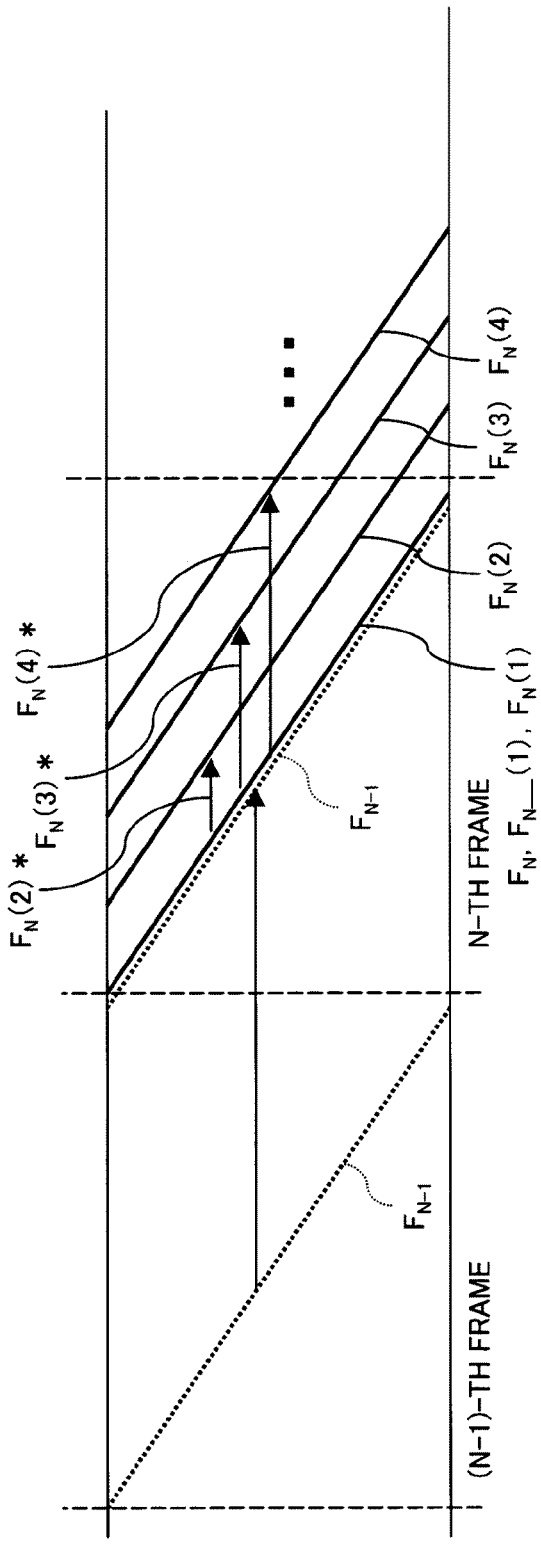
FIG. 15 illustrates relations among image signals on the time axis, in the display apparatus of the embodiment of the present invention, which is shown in FIG. 14.
Figure 16:
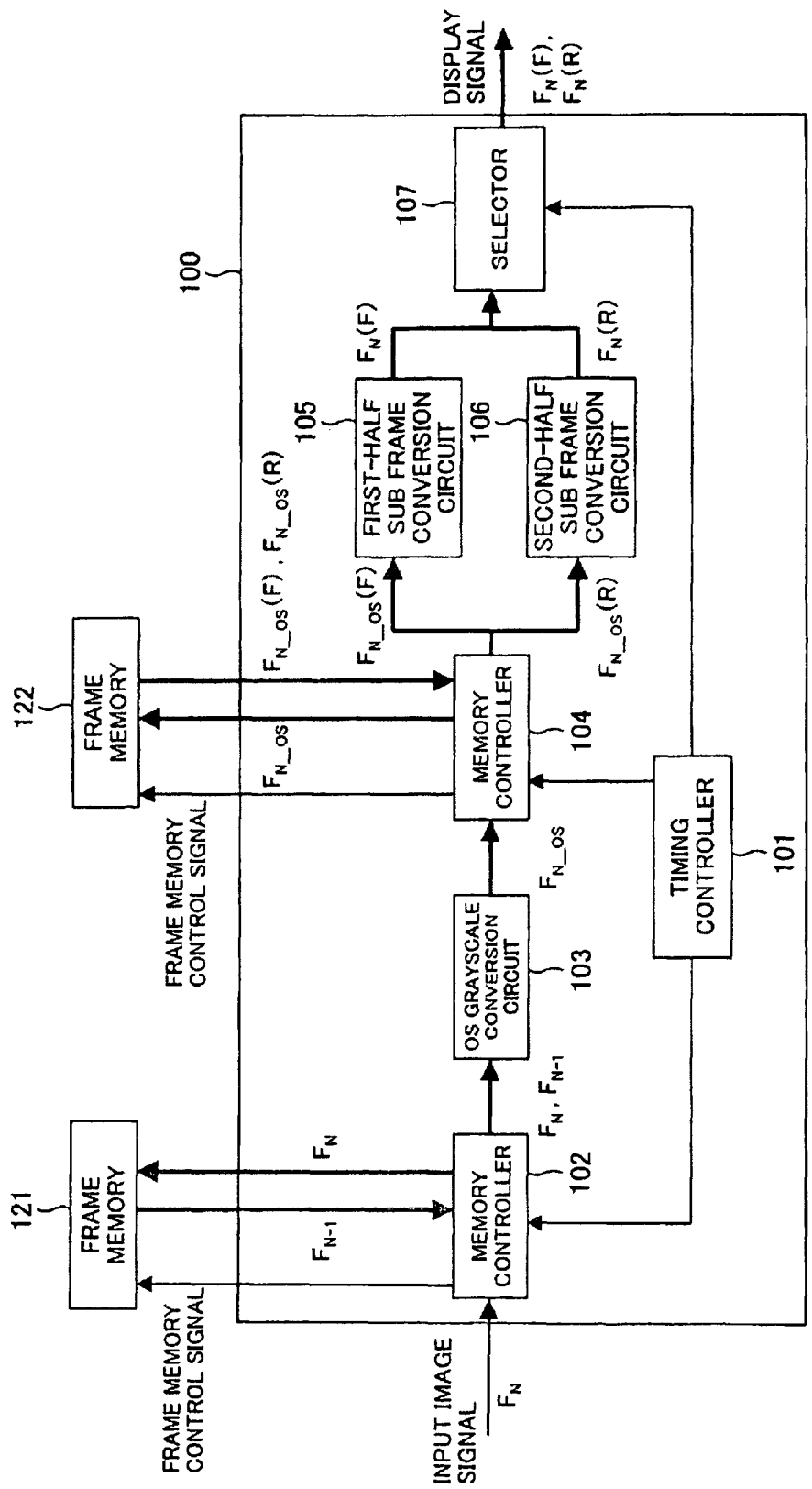
FIG. 16 is a block diagram showing an example of a controller LSI in a conventional display apparatus conducting sub frame display.
Figure 17:
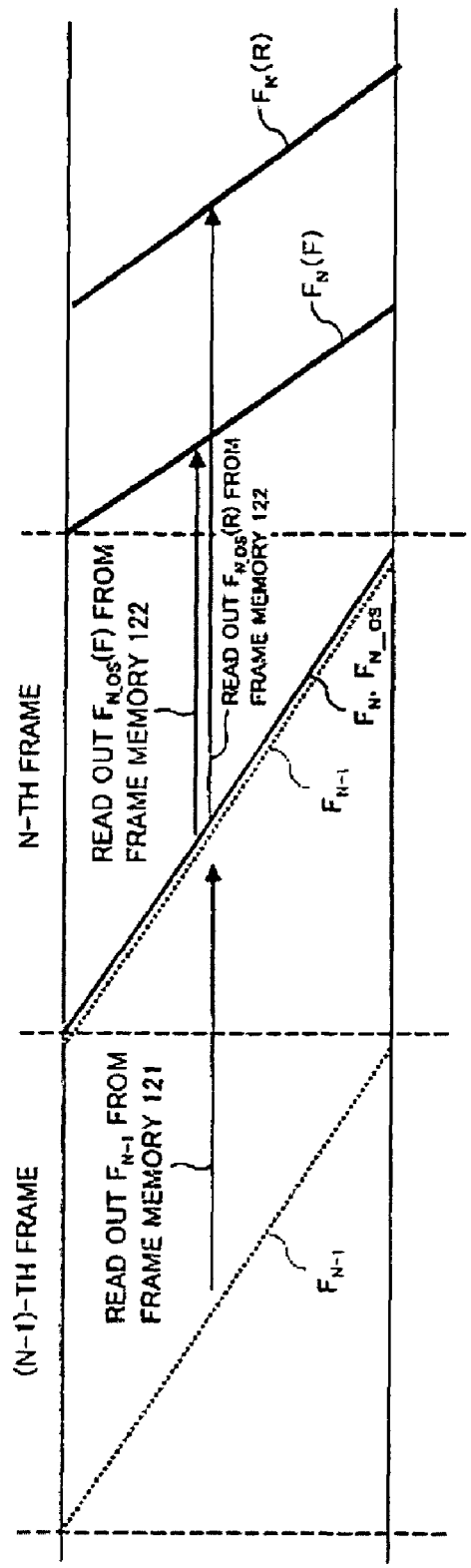
FIG. 17 illustrates relations among image signals on the time axis, in the conventional display apparatus shown in FIG. 16.

FIG. 15 illustrates the relationship on the temporal axis among the image signals dealt with by the control apparatus 10, when one frame is time-divided into n sub frames. As shown in the figure, after the input of the image signal of the N-th frame, the display signal $F_N(1)$ of the first sub frame is output to the display module 19 almost with no delay time. Thereafter, the display signals ($F_N(2), F_N(3), \ldots F_N(n)$) of the second sub frame to the n-th sub frame are output to the display module 19, at each 1/n frame period.

The present display apparatus may be arranged to support plural types (e.g. two types; 60 Hz and 50 Hz) of input frame frequencies. In this case, the control apparatus 10 performs control so as to equalize the display period of the first-half sub frame and the display period of the second-half sub frame, by changing the time from the input of the image signal to each horizontal line to the display operation for the first-half sub frame, in accordance with a change in the input frame frequency (i.e. a change in the length of one frame period).

In this way, even if the length of one frame period is changed on account of a change of the input frame frequency, the temporal ratio between sub frame periods in one frame period is not changed. Therefore, a time integral amount of display brightness of each sub frame is not changed in one frame period. It is therefore possible to use the same grayscale conversion value for each sub frame, even if a frame frequency is different, and hence the cost for the grayscale conversion means is restrained.

Depending on the response characteristics of the display module, there is a case where the lengths of sub frames are not required to be identical to enhance the improvement in motion blur. In such cases, grayscale conversion values corresponding to input frame frequencies are prepared even if cost increase is involved. Therefore the present invention is not limited to a case where sub frame periods have the same lengths.

Depending on an external input apparatus connected to the present display apparatus, such as a tuner section of a TV receiver and a PC, the length of one input frame period may be unstable. For example, the input frame total line number may be randomly changed in the range of T−3 and T+3, as compared to the standard total line number T. As for such a variation in one input frame period, if the length of each frame period is always fine-tuned in accordance with the input one frame total line number, the cost of the control circuit increases. For this reason, for such a variation in the input one frame period, a time from the input of the image signal to each horizontal line to the display operation of the horizontal lines in the second sub frame is fixed with reference to the standard total line number T.

For example, in case where the control apparatus 10 can deal with two types of input frame frequencies, 60 Hz and 50 Hz, two standard input one frame total lines, T1 for 60 Hz and T2 for 50 Hz, are prepared.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention can be widely used for display monitors for PCs or the like and various display apparatuses such as television receivers. In the present invention, the decrease in the moving image quality on account of an insufficient response of an image display panel is restrained, and a time lag between the input of an image signal and actual display of an image is shortened. The present invention is therefore particularly suitable for television receivers or the like, which are required to output a display image in sync with sound, and display monitors of PCs and game consoles or the like, which are required to promptly update the image display in response to an input.

The invention claimed is:

1. A driving control apparatus of a display apparatus which displays an image by time-dividing one frame of an input image signal into first to n-th (n is an integer not less than 2) sub frames, the driving control apparatus comprising:

signal generation means for generating first to n-th display signals for the first to n-th sub frames, respectively, in such a way that a total sum of brightness of a display screen of a display module in one frame is not changed by a division of the frame; and signal correction means for generating a corrected display signal in such a way that, to improve a response speed of a pixel in which a grayscale level of a first display signal of an N-th frame (N is an integer not less than 2), the first display signal being generated by the signal generation means, is changed for more than a predetermined value with respect to a grayscale level of an input image signal of an (N−1)-th frame, the grayscale of the first display signal for the pixel is corrected, the signal generation means for (i) adjusting the grayscale level of the first display signal within a range from a minimum value to a second predetermined value which is smaller than a maximum value and setting grayscale levels of the second to n-th display signals to be a value which is identical with the minimum value when an image having low brightness is displayed, and (ii) setting the grayscale level of the first display signal at the second predetermined value and adjusting the grayscale levels of the second to n-th display signals within a range from the minimum value to the maximum value, when an image having high brightness is displayed, and the signal correction means correcting the grayscale level of the first display signal within a range from the minimum value to the maximum value, but not correcting the grayscale levels of the second to n-th display signals.

2. The driving control apparatus as defined in claim 1, wherein, the second predetermined value is arranged so that brightness when a voltage corresponding to a display signal at the second predetermined value is applied to the pixel and hence the pixel is at a static state is identical with brightness to which the pixel reaches in the first sub frame, when the pixel, which has been in the static state because of supply of a voltage corresponding to a display signal having a grayscale level which is at the minimum value, receives a voltage corresponding to a display signal having the maximum grayscale level, in the first sub frame.

3. The driving control apparatus as defined in claim 1, further comprising:

timing control means for generating a control signal which causes the display screen of the display module to perform image display using (i) the first display signal or the corrected display signal and (ii) the display signals of the second to n-th sub frames, the timing control means generating the control signal in such a way that (I) an image display period of a first sub frame of the N-th frame (N is an integer not less than 2) is arranged to partly overlap at least an image display period of a second sub frame of the N-th frame and an image display period of an n-th sub frame of the (N-1)-th frame so that a period during which a pixel voltage is written into all horizontal lines of the display screen in each sub frame is arranged to be identical with a period of inputting the image signal in one frame, and (II) a delay time from input of the image signal of the N-th frame to the horizontal lines to writing of the pixel voltage in the first sub frame of the N-th frame is arranged to be shorter than the half of one frame of the input image signal.

4. The driving control apparatus as defined in claim 3, wherein, the timing control means generates the control signal in such a way that pixel voltages corresponding to the respective display signals of the first to n-th sub frames are output for one horizontal line each time and in a time division manner, from a data signal line driving circuit of the display module, and selection signals are output from a scanning signal line driver circuit, in accordance with the output of the pixel voltages.

5. The driving control apparatus as defined in claim 1, further comprising:
timing control means for generating a control signal which causes the display screen of the display module to perform image display using (i) the first display signal or the corrected display signal and (ii) the display signals of the second to n-th sub frames,
the timing control means generating the control signal in such a way that (I) an image display period of a first sub frame of the N-th frame (N is an integer not less than 2) is arranged to partly overlap at least an image display period of a second sub frame of the N-th frame and an image display period of an n-th sub frame of the (N-1)-th frame so that a period during which a pixel voltage is written into all horizontal lines of the display screen in each sub frame is arranged to be identical with a period of inputting the image signal in one frame, and (II) a delay time from input of the image signal of the N-th frame to the horizontal lines to writing of the pixel voltage in the first sub frame of the N-th frame is arranged to be shorter than 20% of one frame of the input image signal.

6. The driving control apparatus as defined in claim 5, wherein, the timing control means generates the control signal in such a way that pixel voltages corresponding to the respective display signals of the first to n-th sub frames are output for one horizontal line each time and in a time division manner, from a data signal line driving circuit of the display module, and selection signals are output from a scanning signal line driver circuit, in accordance with the output of the pixel voltages.

7. A display apparatus, comprising:
the driving control apparatus as defined in claim 1, and
a display module whose driving is controlled by the driving control apparatus.

8. A display monitor, comprising:
the display apparatus as defined in claim 7, and
signal input means for transmitting an image signal supplied from outside to the display apparatus.

9. A television monitor, comprising the display apparatus as defined in claim 7.

10. A driving control apparatus of a display apparatus which displays an image by time-dividing one frame of an input image signal into first to n-th (n is an integer not less than 2) sub frames,
the driving control apparatus comprising:
signal generation means for generating first to n-th display signals for the first to n-th sub frames, respectively, in such a way that a total sum of brightness of a display screen of a display module in one frame is not changed by a division of the frame; and
signal correction means for generating a corrected display signal in such a way that, to improve a response speed of a pixel in which a grayscale level of a first display signal of an N-th frame (N is an integer not less than 2), the first display signal being generated by the signal generation means, is changed for more than a predetermined value with respect to a grayscale level of an input image signal of an (N-1)-th frame, the grayscale of the first display signal for the pixel is corrected, but grayscale levels of second to n-th display signal are not corrected,
the signal generation means generating the first display signal from the input image signal without an intervention of a frame memory storing the input image signal, and generating display signals of the second to n-th sub frames by reading out the input image signal stored in the frame memory.

11. The driving control apparatus as defined in claim 10, wherein, the signal generation means (i) adjusts the grayscale level of the first display signal within a range from a minimum value to a second predetermined value which is smaller than a maximum value and setting grayscale levels of the second to n-th display signals to be a value which is identical with the minimum value when an image having low brightness is displayed, and (ii) sets the grayscale level of the first display signal at the second predetermined value and adjusting the grayscale levels of the second to n-th display signals within a range from the minimum value to the maximum value, when an image having high brightness is displayed, and
the signal correction means corrects the grayscale level of the first display signal within a range from the minimum value to the maximum value, but does not correct the grayscale levels of the second to n-th display signals.

12. The driving control apparatus as defined in claim 11, wherein, the second predetermined value is arranged so that a brightness when a voltage corresponding to a display signal at the second predetermined value is applied to the pixel and hence the pixel is at a static state is identical with a brightness to which the pixel reaches in the first sub frame, when the pixel, which has been in the static state because of supply of a voltage corresponding to a display signal having a grayscale level which is at the minimum value, receives a voltage corresponding to a display signal having the maximum grayscale level, in the first sub frame.

13. The driving control apparatus as defined in claim 10, further comprising:
timing control means for generating a control signal which causes the display screen of the display module to perform image display using (i) the first display signal or the corrected display signal and (ii) the display signals of the second to n-th sub frames,
the timing control means generating the control signal in such a way that (I) an image display period of a first sub frame of the N-th frame (N is an integer not less than 2) is arranged to partly overlap at least an image display period of a second sub frame of the N-th frame and an image display period of an n-th sub frame of the (N-1)-th frame so that a period during which a pixel voltage is written into all horizontal lines of the display screen in each sub frame is arranged to be identical with a period of inputting the image signal in one frame, and (II) a delay time from input of the image signal of the N-th frame to the horizontal lines to writing of the pixel voltage in the first sub frame of the N-th frame is arranged to be shorter than the half of one frame of the input image signal.

14. The driving control apparatus as defined in claim 13, wherein, the timing control means generates the control signal in such a way that pixel voltages corresponding to the respective display signals of the first to n-th sub frames are output for one horizontal line each time and in a time division manner, from a data signal line driving circuit of the display module, and selection signals are output from a scanning signal line driver circuit, in accordance with the output of the pixel voltages.

15. The driving control apparatus as defined in claim 10, further comprising:
timing control means for generating a control signal which causes the display screen of the display module to perform image display using (i) the first display signal or the corrected display signal and (ii) the display signals of the second to n-th sub frames,
the timing control means generating the control signal in such a way that (I) an image display period of a first sub frame of the N-th frame (N is an integer not less than 2) is arranged to partly overlap at least an image display period of a second sub frame of the N-th frame and an image display period of an n-th sub frame of the (N-1)-th frame so that a period during which a pixel voltage is written into all horizontal lines of the display screen in each sub frame is arranged to be identical with a period of inputting the image signal in one frame, and (II) a delay time from input of the image signal of the N-th frame to the horizontal lines to writing of the pixel voltage in the first sub frame of the N-th frame is arranged to be shorter than 20% of one frame of the input image signal.

16. The driving control apparatus as defined in claim 15, wherein, the timing control means generates the control signal in such a way that pixel voltages corresponding to the respective display signals of the first to n-th sub frames are output for one horizontal line each time and in a time division manner, from a data signal line driving circuit of the display module, and selection signals are output from a scanning signal line driver circuit, in accordance with the output of the pixel voltages.

17. A display apparatus, comprising:
the driving control apparatus as defined in claim 10, and
a display module whose driving is controlled by the driving control apparatus.

18. A display monitor, comprising:
the display apparatus as defined in claim 17, and
signal input means for transmitting an image signal supplied from outside to the display apparatus.

19. A television monitor, comprising the display apparatus as defined in claim 17.

20. A display method for displaying an image by time-dividing one frame of an input image signal into first to n-th (n is an integer not less than 2) sub frames,
the method comprising the steps of:
(i) generating first to n-th display signals for the first to n-th sub frames, respectively, in such a way that a total sum of brightness of a display screen of a display module in one frame is not changed by a division of the frame; and
(ii) generating a corrected display signal in such a way that, to improve a response speed of a pixel in which a grayscale level of a display signal of a first sub frame of an N-th frame (N is an integer not less than 2), the display signal being generated by the step (i), is changed for more than a predetermined value with respect to a grayscale level of an input image signal of an (N-1)-th frame, the grayscale of the first display signal for the pixel is corrected,
in the step (i), (a) adjusting the grayscale level of the first display signal within a range from a minimum value to a second predetermined value which is smaller than a maximum value and setting grayscale levels of the second to n-th display signals to be a value which is identical with the minimum value when an image having low brightness is displayed, and (b) the grayscale level of the first display signal being set at the second predetermined value and adjusting the grayscale levels of the second to n-th display signals within a range from the minimum value to the maximum value, when an image having high brightness is displayed, and
in the step (ii), the grayscale level of the first display signal is corrected within a range from the minimum value to the maximum value, but the grayscale levels of the second to n-th display signals are not corrected.

21. A display method for displaying an image by time-dividing one frame of an input image signal into first to n-th (n is an integer not less than 2) sub frames,
the method comprising the steps of:
(i) generating first to n-th display signals for the first to n-th sub frames, respectively, in such a way that a total sum of brightness of a display screen of a display module in one frame is not changed by a division of the frame; and
(ii) generating a corrected display signal in such a way that, to improve a response speed of a pixel in which a grayscale level of a first display signal of an N-th frame (N is an integer not less than 2), the first display signal being generated by the signal generation means, is changed for more than a predetermined value with respect to a grayscale level of an input image signal of an (N-1)-th frame, the grayscale of the first display signal for the pixel is corrected, but grayscale levels of second to n-th display signals are not corrected,
in the step (i), the first display signal being generated from the input image signal without an intervention of a frame memory storing the input image signal, and display signals of the second to n-th sub frames being generated by reading out the input image signal stored in the frame memory.

22. The display method as defined in claim 21, wherein, in the step (i), (a) the grayscale level of the first display signal is adjusted within a range from a minimum value to a second predetermined value which is smaller than a maximum value and setting grayscale levels of the second to n-th display signals to be a value which is identical with the minimum value when an image having low brightness is displayed, and (b) the grayscale level of the first display signal is set at the second predetermined value and adjusting the grayscale levels of the second to n-th display signals within a range from the minimum value to the maximum value, when an image having high brightness is displayed, and
in the step (ii), the grayscale level of the first display signal is corrected within a range from the minimum value the maximum value, the grayscale levels of the second to n-th display signals are not corrected.

* * * * *